United States Patent
Abou-Sayed et al.

(10) Patent No.: US 11,078,757 B2
(45) Date of Patent: *Aug. 3, 2021

(54) SLURRIFICATION AND DISPOSAL OF WASTE BY PRESSURE PUMPING INTO A SUBSURFACE FORMATION

(71) Applicant: Advantek International Corporation, Houston, TX (US)

(72) Inventors: Ahmed S. Abou-Sayed, Houston, TX (US); Gareth Block, Houston, TX (US); Omar Abou-Sayed, Houston, TX (US)

(73) Assignee: Advantek International Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,914

(22) Filed: Jan. 22, 2020

(65) Prior Publication Data

US 2020/0157921 A1    May 21, 2020

Related U.S. Application Data

(63) Continuation of application No. 15/323,075, filed as application No. PCT/US2015/038713 on Jun. 30, 2015, now Pat. No. 10,633,953.

(60) Provisional application No. 62/019,083, filed on Jun. 30, 2014.

(51) Int. Cl.
| | |
|---|---|
| *E21B 41/00* | (2006.01) |
| *B65G 5/00* | (2006.01) |
| *E21B 47/00* | (2012.01) |
| *E21B 43/26* | (2006.01) |
| *E21B 49/00* | (2006.01) |

(52) U.S. Cl.
CPC ............ *E21B 41/0057* (2013.01); *B65G 5/00* (2013.01); *E21B 41/0092* (2013.01); *E21B 47/00* (2013.01); *E21B 43/26* (2013.01); *E21B 49/00* (2013.01)

(58) Field of Classification Search
CPC .. E21B 41/0057; E21B 41/0092; E21B 47/00; E21B 43/26; E21B 49/00; B65G 5/00
See application file for complete search history.

(56) References Cited

U.S. PATENT DOCUMENTS

| | | | | |
|---|---|---|---|---|
| 9,187,996 | B1* | 11/2015 | Nevison | ................... E21B 43/34 |
| 10,633,953 | B2* | 4/2020 | Abou-Sayed | ....... E21B 41/0092 |
| 2013/0338985 | A1* | 12/2013 | Garcia | ..................... G06F 9/44 |
| | | | | 703/10 |
| 2014/0122047 | A1* | 5/2014 | Saldivar | .................. E21B 44/00 |
| | | | | 703/10 |

(Continued)

*Primary Examiner* — Yong-Suk (Philip) Ro
(74) *Attorney, Agent, or Firm* — Peter V. Schroeder; Booth Albanesi Schroeder, PLLC

(57) ABSTRACT

Presented is a computerized method for management of a slurry injection well and the associated surface facility. The method utilizes real time and historical data of injection and slurry parameters in conjunction with computer simulations on a computer-modelled reservoir to predict well behavior during one or a series of injection events. The system determines optimized injection operation schedules, recommends and implements changes to an injection operation, including while in process such as through automated equipment control.

20 Claims, 6 Drawing Sheets

(56) References Cited

U.S. PATENT DOCUMENTS

| | | | |
|---|---|---|---|
| 2014/0246194 A1* | 9/2014 | Artus | E21B 43/17 |
| | | | 166/271 |
| 2014/0262232 A1* | 9/2014 | Dusterhoft | E21B 43/26 |
| | | | 166/250.1 |
| 2014/0290942 A1* | 10/2014 | Brodie | E21B 41/0092 |
| | | | 166/252.5 |
| 2014/0350902 A1* | 11/2014 | Lange | E21B 49/00 |
| | | | 703/2 |
| 2015/0096756 A1* | 4/2015 | Sharma | E21B 43/26 |
| | | | 166/306 |

* cited by examiner

SLURRIFICATION AND DISPOSAL OF WASTE BY PRESSURE PUMPING INTO A SUBSURFACE FORMATION

CROSS-REFERENCE TO RELATED APPLICATIONS

This is a U.S. continuation application claiming priority to U.S. application Ser. No. 15/323,075, filed Dec. 29, 2016, and PCT Application PCT/US2015/038713, filed Jun. 30, 2015, and to U.S. Provisional Application Ser. No. 62/019,083, filed Jun. 30, 2014.

TECHNICAL FIELD

The disclosure relates generally to the oil and gas industry and other industries that produce fluid and solid waste, namely to management of a slurry injection well and the associated surface facility. More particularly, the disclosure relates to utilizing a combination of data-mining, engineering, analysis, and software for subsurface simulation to optimize and execute slurrification and disposal by pressure pumping into a subsurface formation.

BACKGROUND

Drilling into (and hydraulic fracturing of) subterranean zones to enable and or enhance recovery of hydrocarbons is now common practice in the oil and gas industry. However, drilling and other oil and gas production processes often result in massive amounts of waste which must be disposed. The waste can contain drilling solids and fluids, stimulation treatment fluids, sand, fines, and other solids from the wellbore, proppant and chemicals from hydraulic fracturing, produced water, brine, hydrocarbons and other fluid and solid components accumulated during oil and gas production. Waste streams from numerous other industries (including but not to waste from chemical manufacturing, waste from landfills, waste from residential sources, waste from refining practices, radioactive waste generated during recycling and processing, and biological and or other hazardous wastes) also lead to fluid and solid waste types that can be managed using the disclosed methods. One method of disposing of these waste streams is injection into a subterranean zone using a disposal well. In some methods of disposal, the disposal well is completed in one or more subterranean zones that are fractured or re-fractured during injection.

As with oil and gas production wells, it is useful to know or estimate various properties of the zones that may be used for injection, insofar as these properties may directly or indirectly affect the impact of injection on the surrounding reservoir volume, containment of the injected fluids, and fracture behavior during and after injection. It has also become important to estimate which of the properties can be used to identify targeted zones for injection, and how these properties change over time. The operating procedures used to carry out injection operations (which lead to fracture behaviors) are tightly coupled with the subsurface geology and its dynamic response to injection. A robust methodology that accounts for this coupling, and which includes real-time feedback to enables and provide directional changes to the operating procedures, helps ensure safe and optimal disposal.

BRIEF DESCRIPTION OF THE DRAWING

For a more complete understanding of the features and advantages of the present disclosure, reference is now made to the detailed description of the disclosure along with the accompanying figures in which corresponding numerals in the different figures refer to corresponding parts and in which.

DETAILED DESCRIPTION

Figure 1:
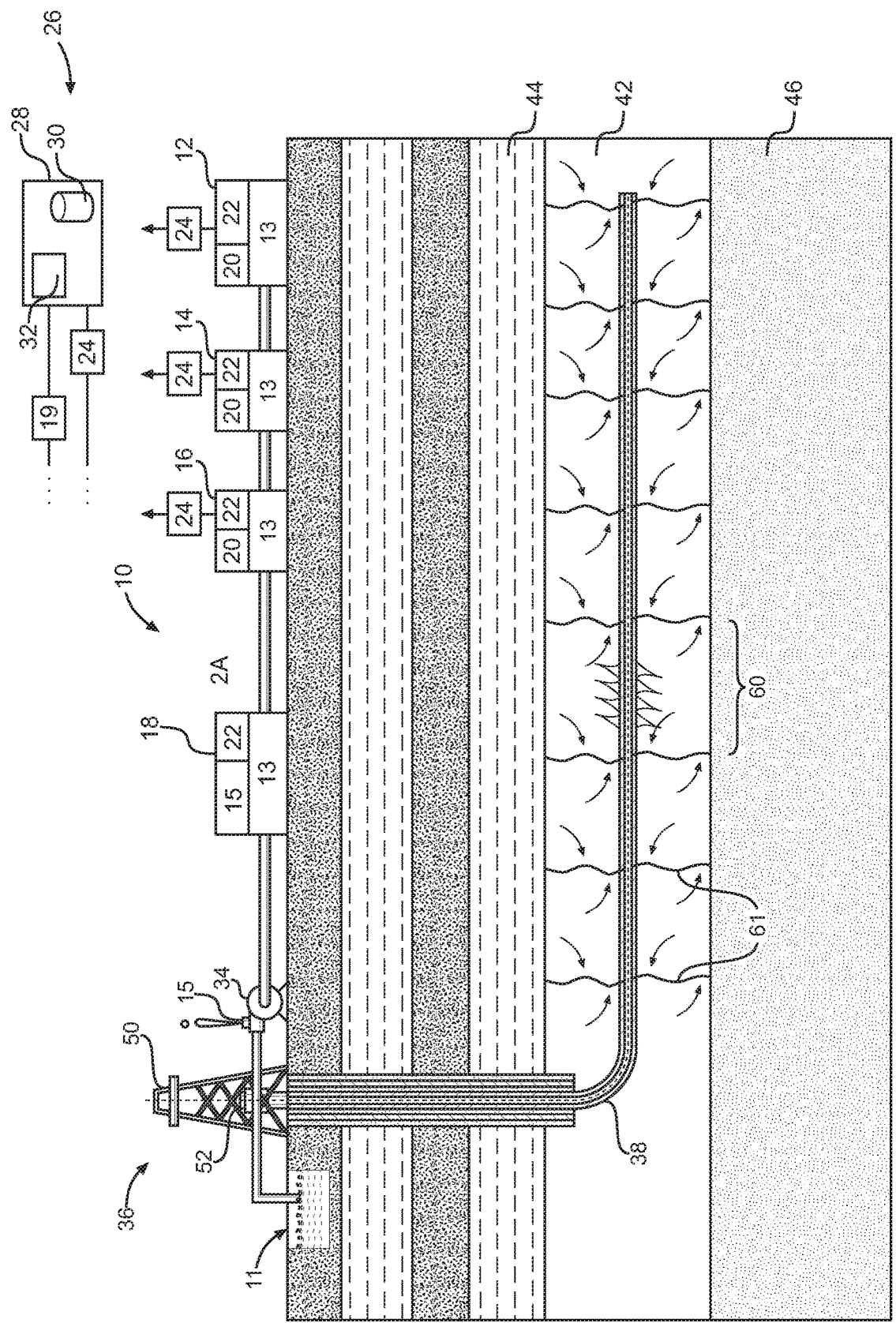
FIG. 1 is a schematic of an exemplary waste disposal facility, generally designated 10, according to an aspect of the disclosure.

The present disclosures are described by reference to drawings showing one or more examples of how the disclosures can be made and used. In these drawings, reference characters are used throughout the several views to indicate like or corresponding parts. In the description which follows, like or corresponding parts are marked throughout the specification and drawings with the same reference numerals, respectively. Figures are not intended to be to-scale.

System and Facility Overview

The disclosure identifies a preferred sequence, combination, and coupling of computerized methods for performing Front-End Engineering Design (FEED) studies and active operational management of a waste slurry injection well, before, during, and after injection, and of the associated surface facility.

The disclosed FEED study and related methods and apparatus utilize a combination of data-mining, engineering, analysis, and software for computerized subsurface simulation (computer modelling) to optimize and execute slurrification and disposal of waste by pressure pumping into, and often fracturing of, a zone of a subsurface formation.

The methods disclosed provide a system-wide coordination of activities and metrics for: deciding among a plurality of sites which are optimal for locating a disposal facility based on economic market conditions and local regulations; deciding which geologic formations may be used for injection; forecasting the subsurface disposal capacity under various operating conditions; determining surface storage requirements to accommodate the most cost-effective types and volumes of various waste streams; and definition of additional useful metrics, one of which is called an "Operating Window," which provides operators with an understanding of how best to interpret subsurface injection behavior in view of the site's Maximum Allowed Surface Injection Pressure (MASIP). The MASIP may be limited by facility, equipment, regulation, results of the methods disclosed herein, or any combination of these constraints.

The disclosed methods include a computerized Well Management System to identify anomalous and or critical injection behaviors that can affect the optimized results, well management, and safety. The Well Management System utilizes real-time and archived data measured at the well, facility surface equipment, or surrounding area, including one or more of the following: the time-dependent surface tubing, annular and bottom-hole well pressure (measured at one or more positions along the well, and in particular, above where injection into the rock occurs), injection flow rate, injected fluid rheology (including, but not limited to, temperature and solids concentration-dependent density and viscosity), surface tank volumes, earthquake and or seismic activity, and other sensors placed temporarily or permanently inside or outside the well or at neighboring offset wells (to measure, for example, temperature and acoustic emissions inside the reservoir). The real-time and or archived data can be used by the Well Management System to update the method's optimized injection parameters so that waste disposal is maximized and risk associated with injection is minimized.

The description herein is directed, primarily, to injection of waste slurry into one or more subsurface zones. Notwithstanding anything else herein, the methods and apparatus with regard to the control system, injection simulations, real time process monitoring, on-going software operation and updated parameters, and automated equipment operation can be applied to, with minor modification in some cases, injection operations more broadly including water flooding to maintain reservoir pressure in producing wells and injection to create hydraulic fractures for stimulation of production wells.

Slurry Injection Facility

FIG. 1 is a schematic of an exemplary waste disposal facility, generally designated 10, according to an aspect of the disclosure. The disclosed methods enable safe and cost-effective operation of waste disposal and processing facilities which utilize subsurface, injection. An optimally designed facility 10 enables operators to receive high volumes of a variety of waste streams (solid, fluid, and mixtures thereof). In case the waste streams are from oil and gas Exploration and Production (E&P), the wastes typically consist of drill cuttings, drilling fluids, drilling muds, completion fluids, production fluids, waste-water, tank bottoms, emulsions, wash-down fluids, truck wash fluids, and/or others liquids, solids and mixtures. Wastes are typically received at a land or off-shore site that serves as the waste facility, prepared into a stable "slurrified," non-sedimenting mixture (slurry), and injected in one or a series of batches into pre-determined sub-surface disposal zones. The waste facility 10 is shown as a land-based facility, without limitation.

The facility utilizes a series of stages or staging areas for receiving and handling waste. Tanks or suitably designed in-ground or above-ground "pits" 11 ensure that various wastes make minimal or no contact with the external environment during the process.

Stages

Stages, staging areas, and sub-systems can include one or more of: waste separation and classification equipment 12, slurry preparation and mixing equipment 14, temporary storage equipment 16 (e.g., holding or agitation tanks until injection is ready to begin), pre-injection slurry-concentrate preparation and injection slurry preparation equipment 18 (e.g., dilution equipment), waste and slurry transportation equipment 20 between staging areas (e.g., pipes, pumps, tanks, trucks). These processes and equipment are known in the art.

Exemplary facility equipment can include scrubbers, separators, mixers, blenders, agitators, slug catchers, filter separators, coalescers, knockout systems, piping, hoses, valving (float, gate, etc.), supply and storage tanks, bins and towers, pumps (transfer, frac, dilution, recycle, etc.), generators, actuators, dehydrators, thermal treatment systems, vacuum systems, compressors, stim equipment, and instrumentation and controls. Conceptually, the equipment can be divided into groups by function; for example, incoming waste stream management and treatment equipment, slurrification equipment, injection equipment (with or without slurry-concentrate dilution for injection), etc.

Slurry Ratios

"Slurry-concentrate" or pre-injection slurry can be stored at pre-injection concentration ratios (or ranges), such as at storage stage 16, above target injection ratios (or target injection ratio range). Fluid preparation at stage 14 ensures the slurry-concentrate is stable. The prepared slurry-concentrate is checked for quality control to ensure slurry concentrate properties are within a selected range of parameter values. Sensed and derived parameters can include slurry concentrate viscosity, density, pressure, volume, flow rates, mix rates, temperatures, etc.

The pre-injection ratio or range is determined from geomechanical computer modelling. In particular, the slurry viscosity, density, and microscopic component sizes are tested to confirm both homogenization and control of particle size.

Where slurry concentration processes are used, the slurry concentrate is converted, prior to or at the time of injection, to injection slurry having the injection concentration ratios or ranges specified. When operators are ready to begin an injection operation, the pre-injection slurry concentrate at 16 is transported to a slurry preparation sub-system 18 where water or other diluents are added and mixed to control slurry rheology prior to high-pressure pumping into a disposal well. The slurry concentrate is diluted to a target injection ratio or range, tested for quality control using real-time networked, sensor equipment for parameter measurement, compared against the chosen parameters, and possibly modified so that the parameters have the desired values or are in the desired ranges.

Injection Cycle

The injection slurry is pumped in batches via high-pressure pumps 34 and associated surface equipment into the injection wellbore 38 and thence to pre-selected subsurface disposal zone(s) 36. High-volume batch injections ensure that the reservoir formation accommodates large volumes of waste slurry from the surface.

The injection slurry is injected into the disposal well 36, via a wellbore 38, which can be cased 40 along all or part of its length, extending through various earth strata, including at least one disposal zone 42. The disposal zone 42 is bounded by upper and lower boundary zones 44, 46. Disposal operations should not breach the boundary zones 44, 46 and disposal waste slurry should remain within the targeted disposal zone both during and after injection operations. Short and long-term storage or disposal should both account for limiting slurry breach of boundary zones. Appropriate pumping 34, valving, and surface equipment 13 are utilized in accordance with industry practice.

Sensor Equipment, Network

Testing, measurement, and quality control processes include use of various sensor equipment at the processing, pre-injection, injection, and post-injection stages. According to an embodiment, a plurality of sensor equipment 22 is used to gather, store, and transmit measured data 24.

As used herein, sensor equipment includes digital and analog sensor equipment and smart sensor equipment such as known in the art. Smart sensors measure parameters (or their surrogates), and also perform calculations and derivations, logic routines, automated sensing, automated and "upon request" data transmission (e.g., push or pull), handle communication via the network (e.g., creating content, compressing, routing, verifying, etc.), and/or provide automated alerts, notifications, and warnings to the operator, and/or can provide automated or on-demand control of facility materials-handling and well equipment. Smart sensors typically have associated computer and memory devices, software or logic programs, communications systems, etc., for controlling sensor operation, reading and storing measured data, performing quality control and verifications, etc. The smart sensors communicate measured data via wire or wireless transmission to connected, networked computer control systems, local or remote from the facility.

Measured data 24 can be provided to the computerized control system 28 in real-time, intermittently, on-demand, or contingently upon occurrence of selected criteria. The data can be recorded, stored, manipulated, archived, etc., at any point in the network. Sensor equipment includes sensors (e.g., temperature), meters (e.g., flow rate), equipment-monitoring sensors (e.g., oil pressure), testing sensors (e.g., pH sensors), etc., as well as the associated computerized devices, hardware, and software for measuring, storing, and communicating measured data.

As used herein, the measured data 24 can include direct parameter measurements (e.g., injection flow rate, slurry viscosity, slurry density, injection time, wellhead and downhole pressures, wellhead and downhole temperatures, time elapsed during injection, acoustic and elastic wave events generated by subsurface dynamics and monitored by geophones placed at the surface or in neighboring offset wells etc.) and data calculated or derived therefrom (e.g., pressure loss between the wellhead and downhole injection zones, predictions of concentration changes along the wellbore, simulations of the resulting injection and reservoir performance and fracturing behaviors, predictions of changes to the reservoir properties caused by the process of injection, etc.).

The computerized system or network 26 can utilize existing infrastructure such as the internet, web, telephony systems, etc. The network includes various elements, as are known in the art, such as servers, routers, gateways, databases, and computer devices, which are connected for data communication.

Data can be collected, stored, analyzed, and used in software programs executed from the computerized control system 28, at the sensors 22, 52, or a combination thereof, locally or remotely, using real-time data or archived data from data storage or non-transitory memory devices 30 operably connected to one or more computers 32 on which a software program is executed.

The computerized control system 28 includes non-transitory memory devices 30, computer devices 32, input and output devices (e.g., screens, keyboards), and is connected via network 26 to facility equipment, sensor equipment, etc. The computerized control system can be localized or dispersed. One or more software programs are executable by the system 28 for communicating, storing and accessing measured data, running injection operation simulations, modelling the reservoir injection 42, boundary 44,46, and other zones, calculating injection and reservoir parameters and behaviors, performing Front End Engineering Design studies for geologic, operational and economic feasibility, etc., where appropriate. Further, the control system 28 is operable to communicate commands to and operate facility equipment, such as injection pumps, slurry dilution equipment, etc.

Stage Sensors

Representative sensor equipment 22 is shown at each stage of the facility process. Sensor equipment can provide measurements and measured data such as density, flow rate, volumes, pressures, mixing rates, rate of parameter changes, viscosity, temperatures, particulate and solids size, and other parameters, at any of the stages. Although a single piece of sensor equipment 22 is shown at each stage, it is understood that each is representative and that typically multiple sensor equipment, measuring numerous parameters, and associated with numerous equipment will actually be in use. The sensor equipment 22 can supply discrete, continuous, automated, and/or real-time measurements of waste and other fluid and mixture volumes, flow rates, mix rates, density, viscosity, and other parameters as known in the art, as well as data regarding the operational parameters of the facility machinery.

Similarly, data 24 is indicated representatively at each stage although it is expected that measured data will be communicated from multiple pieces of facility equipment, sensor equipment, etc., at each stage and across the facility.

Injection Operation Sensors

As with the waste management and slurry preparation stages, sensor equipment 52 can be used before, during, and after a batch injection operation. The sensor equipment 52 can supply measurements of slurry volumes, other fluid volumes, as well as slurry concentrate, injection slurry, and other fluid parameters (e.g., viscosity, density, etc.), and system pressures (e.g., injection and well pressures), injection and flow rates, temperatures, and other parameters. The sensor equipment 52 indicated in FIG. 1 is representative. In actuality, multiple sensor equipment, associated with multiple facility equipment, testing stations, etc., are employed during an injection operation.

In an embodiment, real-time data is communicated between the sensor equipment and control system. The real-time data is input to software operable on the computer control system 28 and, combined with historical and previously input data, the software runs complicated analyses of the computer-modelled injection operation, injection zone, and boundary zones, to provide near real-time analysis of the batch injection on the formation.

Real-Time Computer Modelling and Analysis

Such data is used to facilitate safe and coordinated operations and the execution of computerized analyses which provide a physical description of the response of the injection zone and surrounding reservoir to the injection. These measurements and the analyses they facilitate are used for optimizing well performance, ensuring control of subsurface migration of fluids, and permitting verification of containment and environmentally safe operations. The software can utilize real-time data, supplied from sensor equipment at the well or surface equipment, and historical data. Similarly, the software can be executed before, during, or after an injection operation, and can provide resulting output (e.g., maximum pump pressure, optimal injection rates and durations, optimal batch designs, modifications to designs based on subsequent input, etc.) before, during, or after injection.

The software program identifies injection parameters (e.g., pump pressure, flow rate, slurry density, slurry viscosity, etc.) which, if changed, are most likely to eliminate or mitigate potential damage. The identified parameters are varied and iterative simulations run, according to a convergence formula, to provide an optimal injection operational plan, injection batch design, or other sought output. Where run prior to injection, the operational plan is placed into effect. The simulations utilize measured and historical data as inputs for performing the simulated injection operations.

Alternately, real-time measured data from the injection operation is communicated to and used by the software program. The real-time computer modelling performed by the software can provide results indicating how the injection operations should proceed (according to the batch design) or that operational modifications can or must be made. For example, a real-time injection simulation may indicate an unforeseen or developing potential risk (e.g., loss of containment by fracture growth into a boundary zone or slurry migration) should injection operations continue unabated. Other predetermined limitations may be implicated by real-time simulations, such as regulations, operational hazards, other types of formation damage which negatively impacts current or future injections, etc. Alternately, the computer simulations may result in potential changes or modifications to the injection operation or batch design to be made on-the-fly to optimize waste disposal, operating time, fracture creation, etc. (e.g., increased injection rate, higher injection pressures, etc.).

The software program runs numerous, iterative, injection operation simulations, updating the simulations with real-time data. The computed results indicate, in an example, that maximum slurry disposal requires an increase in injection rate (or other parameter) to obtain a concomitant rise in downhole pressure. The pressure rise, in turn, impacts the injection-induced hydraulic fracture behaviors in one or more subsurface zones. The software program finds and indicates an increase in injection rate necessary to reach the newly-maximized fractures and disposal volumes, without loss of containment or violation of other operational limitations (e.g., regulatory limitations).

Other exemplary results might indicate that slurry density should be decreased for a period of time to change a forecasted hydraulic fracture with non-optimal dimensions (length, width, height). The program outputs data regarding proposed on-the-fly slurry density reduction which, if performed, will result in one or more desired fracture dimensions. The simulations may indicate that injection parameters should be changed from one sequence of slurry properties or injection rates to another sequence so that, for example, volumes of highly concentrated slurry can be preferentially swept deep into an existing fracture.

Further, the software may identify (previously unknown) reservoir features, away from the wellbore, that are hypothesized to exist in order to satisfactorily correlate current observed injection behaviors with simulation-predicted behaviors. For example, the computer simulation program can conclude, based on measured (and input) data, that unexpected scenarios exist, such as, but not limited to, highly permeable conduits for fluid flow, natural fractures, regions of high gas saturation (whose physical motion impacts leak-off of fluid from the injection well), etc. The simulations may indicate that the negative injection behaviors associated with the real-time measurement are related to such reservoir features.

In case natural fractures are predicted to be present, for example, the simulations can indicate that a significant drop in wellhead fluid pressure, caused by rapid leak-off into a natural fracture system, can be mitigated by increasing slurry concentration, on-the-fly, to effectively plug the natural fractures where they intersect injection-induced fractures.

Utilizing simulations of the wellbore, the simulator predicts how identifiable volumes of waste may be delivered to multiple, simultaneously active, subsurface zones. The program's analysis of transient behavior of well-head pressure and other measured data, can also indicate which subsurface zone is undergoing fracture, how many fractures are simultaneously propagating, whether the fractures interact within the reservoir, whether and how waste slurry may commingle within the reservoir, etc. As another example, if the program, based on real-time measured data, concludes that one or more desired fracture has ceased to propagate, the program can indicate a change in injection rate and slurry properties (e.g., increase in injection rate, decrease in slurry viscosity) for a calculated period (seconds, minutes, other) to re-initiate fracturing.

Real-time analysis is only possible due to the speed and power of the computer and software. Potentially thousands of algorithms, calculations, comparisons, iterative functions, and logical instructions must be run in extremely short time periods on the order of minutes or even seconds to provide results quickly enough to enable on-the-fly changes in injection operations. In an embodiment, the software analyzes real-time data at a rate of more than one megabyte per second (MB/s) and runs simultaneously on multiple high-speed processors, which each process data at more than 100 billion Floating-point Operations Per Second (GFLOPS). These processor speeds and data bandwidth management capabilities are critical to the method's success and are orders of magnitude larger than what can be performed by one or more human experts. The enabling technology allows the simulator to predict wellbore, reservoir, and hydraulic fracturing behavior for a range of potential input variables, in real-time, near real-time, or otherwise quickly enough, so that injection operational parameters can be identified, selected, and updated to optimize performance.

Automated Equipment Operation

The methods can also include fully or partially automated equipment control in some embodiments. The network 26 provides connectivity between facility equipment, sensor equipment 22, 52, and the control system 28. Injection Performance Simulator (IPS) to simulate matrix injection and hydraulic fracturing Equipment controllers are commercially available and known in the art and often comprise a computer device, having memory and processing, and various subsystems (communication, monitoring, metering, data management, safety overrides, etc.). Controllers control the equipment, performing tasks (e.g., on/off, power up/down, open/close, etc.) on the equipment. Controllers typically include user interfaces (e.g., screens) allowing monitoring, simple programming, and semi-automated equipment control. The controller provides connectivity to the network and computer control system, Common network protocols (e.g., LonWorks, BACnet, Modbus, etc.) can be used. Controllers can have multiple communication ports, wired and/or wireless, for connectivity to the network, and can communicate via Ethernet, OPC, BACnet IP, Modbus TCP, SNMP, or other protocol.

Relatedly, the network can include gateways associated with the sensor equipment (meters, sub-meters, smart meters, and Data Recorder meters, etc.), equipment controllers (e.g., generator or pump gateways), etc. A gateway can be a physical unit connected to equipment or a software application running at some level of the network. Controllers can include or serve as gateways, providing connectivity integrally with other services of the device.

The facility network can have multiple sub-networks for various functions and controls. The network provides connectivity between facility equipment, sensor equipment, operator computers, the computer control system, etc. The network can employ multiple users, buildings, systems, etc. Network communication can be between: gateways and equipment; pieces of equipment; gateways; equipment and the internet; etc.

Exemplary equipment which can be controlled from the computerized control system at the direction of the IPS program or associated control software include all electrical equipment at the site. For example, surface equipment can include scrubbers, separators, mixers, blenders, agitators, slug catchers, filter separators, coalescers, knockout systems, piping, hoses, valving (float, gate, etc.), supply and storage tanks, bins and towers, pumps (transfer, frac, dilution, recycle, etc.), generators, actuators, dehydrators, thermal treatment systems, vacuum systems, compressors, stim equipment, and instrumentation and controls. Conceptually, the equipment can be divided into groups by function. For example, incoming waste stream management and treatment equipment, slurrification equipment, well or injection equipment (with or without slurry-concentrate dilution for injection). Some equipment, such as a generator or a pump, can include sensors (e.g., temperature, oil pressure, etc.) for monitoring the equipment, and a gateway or controller for managing and communicating resulting data.

Facility automation is controlled by the control system 28. Based on real time or historical measured data, pulled from current monitoring or archives, and the current operation (e.g., injection, slurrification), the control system communicates operating instructions or tasks to the indicated equipment. For example, when a slurrification procedure is underway according to a design or schedule input to or created by the system, monitored sensor equipment may provide measured data regarding current slurry parameters (e.g., viscosity). The control system and software compares monitored and planned parameters, determines processes to correct current parameters to match the planned parameters. The system calculates necessary operating parameters for the correction (e.g., amounts, rates, materials, etc.) and determines corresponding tasks for facility equipment to undertake. In this example, the system corrects an errant slurry viscosity by communicating task instructions (e.g., by signals, data, computer code, etc.), via the network, to corresponding facility equipment, and operating the equipment to increase a fluid flow rate, activate a mixer, etc., to determined operating parameters (e.g., rates, speeds, percentage power, etc.). Further monitoring by the system can confirm achievement of planned viscosity or indicate a need for further tasks.

In an embodiment, the control system provides recommended tasks to the operator (e.g., increase water flow from a supply pipe to a suggested rate), communicated via the network to an operator station. In one embodiment, the operator then makes those changes manually or via local controller. In another embodiment, the operator either allows or disallows the recommended tasks. If allowed, the control system automatically operates the equipment accordingly. Operation of equipment requires connectivity and communication through the network and appropriate controllers and gateways. The controllers and gateways receive and interpret incoming messages and perform the action on the equipment. Thus, the computerized control service receives and analyzes incoming data, and if indicated takes one or more actions, communicates with facility equipment gateways and/or controllers, and actually alters and controls the operation of facility equipment, thereby changing the operating parameters of an on-going operation.

Further automation examples are provided below regarding use of real time data to run injection simulations, calculate behavior forecasts, identify potential problems or opportunities, determine appropriate changes to planned schedules to avoid issues or take advantage of opportunities, and then, in some embodiments, automatically operate the implicated equipment at the site to make the necessary changes. Monitoring for verification and performing iterative corrective calculations and equipment actuation is also contemplated.

The facility automation services can be performed on platforms using cloud computing. Commercially available services providing a platform, infrastructure, and software are available such as cloud solutions offered by the major web service companies. Unless otherwise claimed, the particular location and type of infrastructure, hardware, software, hierarchy, etc., is not critical. Persons of skill in the art will recognize additional distributed and local systems capable of performing the services and functions described herein. Services can be provided as Software as a Service, as explained elsewhere herein.

The computer control system and associated software can alternately be considered a service provider capable of implementing services for and at the facility. The software continues to gather, store, and analyze data, monitoring facility equipment, performing injection operation simulations, determining batch injection schedules, and, in some embodiments, performing real time analysis based on gathered real time data to determine expected reservoir behavior and, depending on the results, recommending corrective or alternate actions, and/or automatically operating facility equipment to implement the recommendations.

SUMMARY

In summary, a disclosed method provides an optimal FEED study and operating method to coordinate activities and provide metrics for use in facility and injection well siting, disposal zone selection, surface facility design, and on-going injection operations to optimize facility operation, disposal capacity, and operational safety.

An exemplary FEED study for a proposed Slurry Injection Facility (SIF) evaluates a project's feasibility in one or more of the following categories: 1) Economic Feasibility, 2) Geologic Feasibility, and 3) Operational Feasibility. The Operational Feasibility often depends on local regulations for operating an injection well, which may restrict Maximum Allowable Surface Injection Pressure (MASIP), total daily volumes, placement of the injection interval (within one or more zones), and facility design and location.

Economic Feasibility

An exemplary FEED study according to embodiments of the disclosure includes a study of Economic Feasibility for a proposed Slurry Injection Facility (SIF).

Figure 2:
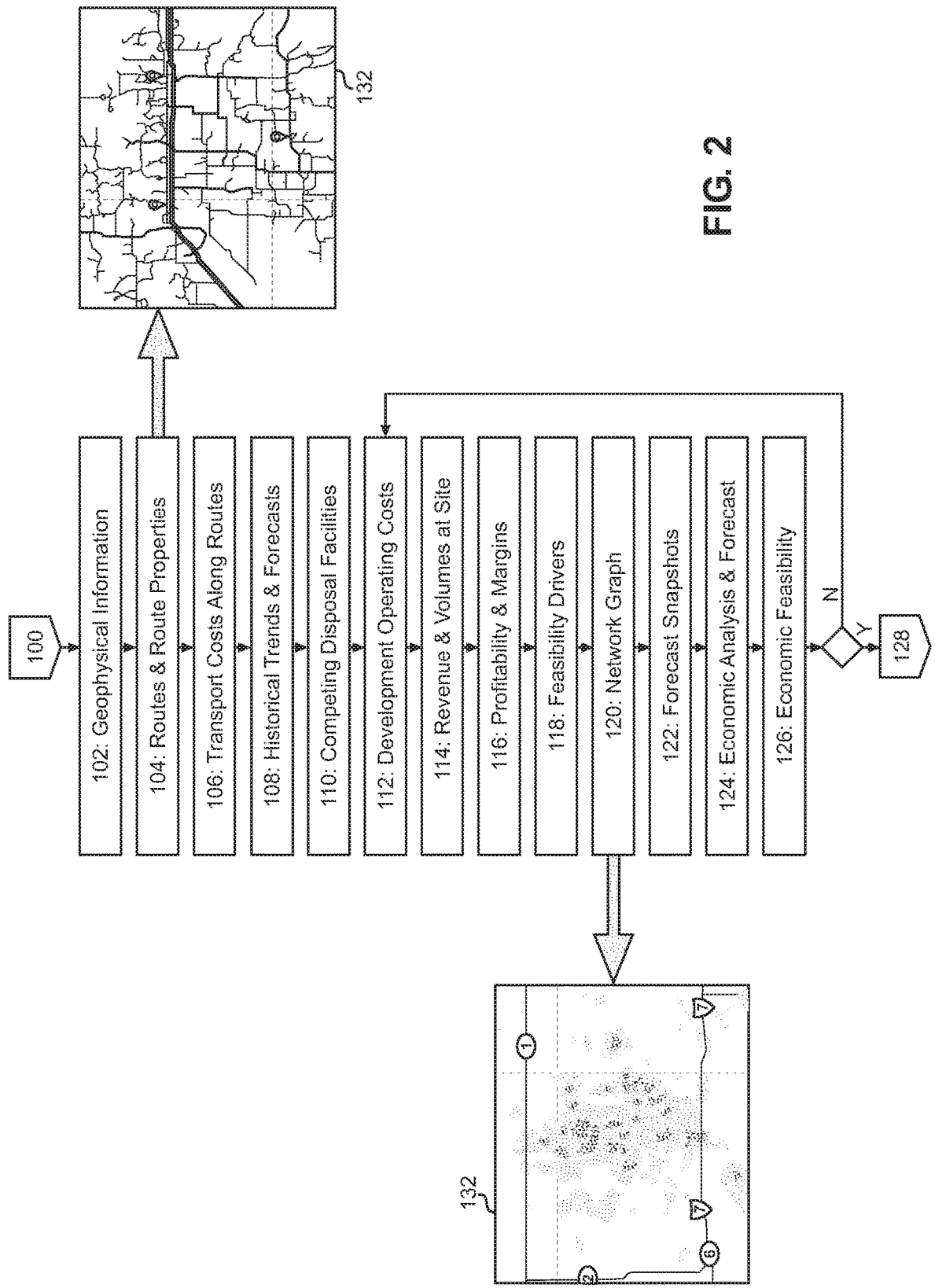
FIG. 2 is an exemplary flow chart for an Economic Feasibility FEED study according to aspects of the disclosure.

FIG. 2 is an exemplary flow chart for an Economic Feasibility FEED study according to aspects of the disclosure. Economic Feasibility analysis begins at block 100 and can include identification and analysis of geographic information re: a targeted geographical area at 102, including the locations of one or more waste sources (e.g., sites where E&P drilling is occurring or may be expected to occur, E&P wells that produce water or brine that needs to be disposed, etc.). Identification and analysis of the routes and route properties at 104 (e.g., distance, drive-time, easements, rights of way, pipeline tie-ins, land ownership, etc.) between each waste source and the proposed SIF, to determine which waste sources are likely to contribute waste volumes to the SIF.

One embodiment utilizes a geographical map with routes highlighted to indicate the possibility of delivering one or more waste types from each waste source. In one example, the cumulative distance or time driven from each waste source (red flags on map) is limited by a user-defined value (e.g., 50 miles or one hour of transit time) so that a bounded region in the map can be identified for each waste source. Further, given an assumed fuel cost, the transport cost associated with each leg of the journey (along any particular route between the waste source and a given geographical position) can be determined at 106.

Identification of historical waste generation and disposal trends and forecasts of future waste volumes from available data sources at 108. For example, data about wells which have been drilled, wells which are producing and what they are producing, permits for drilling new wells can be used to estimate past and future waste generation volumes. Furthermore, data about disposal volumes (and their sources) from regional disposal sites can be used to model current waste disposal patterns which influence the economic feasibility of a proposed new site. Such analysis can be generalized. For example, in residential waste, data about new home development or construction permits can be used to forecast new waste disposal capacity needed in a given territory. Similar data re: E&P wells can be used to predict future waste handling needs.

Identification and analysis of competing disposal facilities and other economic drivers impacting expected market share at 110.

Development and Operating costs are estimated at 112 and revenue and expected waste volume are estimated at 114.

Profitability and margins are calculated based on revenue and cost estimations at 116.

Feasibility drivers are identified at 118, including parameters having disproportionate effect on feasibility. For example, transport costs due to a large geographical area may be identified. Once identified, these drivers inform potential changes to reach feasibility.

The market area can be defined and analyzed using a network graph 130 whose hub is the proposed SIF and whose nodes are the Waste Sources at 120. The edges of the graph can be weighted according to expected volumes and transport costs (typically measured per unit volume). One embodiment of the results of this network graph is in the form of a "heat map" 132 over a given geographical area. In this example, the colors of the heat map may indicate the historical or forecasted volumes that have or are expected to be deliverable to any geographical location. A variety of functions can be used to visualize (and enable users to evaluate) different metrics concerning volumes delivered, transportation costs, revenues, overall feasibility, etc.

Given historical waste generation and disposal and expected future activity, waste source volumes and locations are used to produce a sequence of snapshots in time, at 122. An exemplary "snapshot" indicates a geographic distribution of volumes of waste types that may be available in multiple areas, geographic distributions of potential income from the waste volumes, incorporating transport costs, expected percentages of market, competing disposal sites, etc.

The resulting economic analysis at 124 indicates potential, economically feasible SIF sites, optimal locations for obtaining the largest volume of waste, of preferred waste types, at the lowest cost, and at the greatest profitability.

Further, after performance of the additional FEED studies discussed herein, the results of those studies can be input at 126 and the economic feasibility study updated based on whether geologic and operational feasibility is achieved at identified SIF sites. Thus the identification of economically acceptable sites is informed by identification and cross-reference with geologic and operational feasibilities. The method ends at 128 once feasibility is indicated. If not, the method returns to an earlier steps, such as step 114, for example, for further analysis.

Geologic Feasibility

Figure 3:
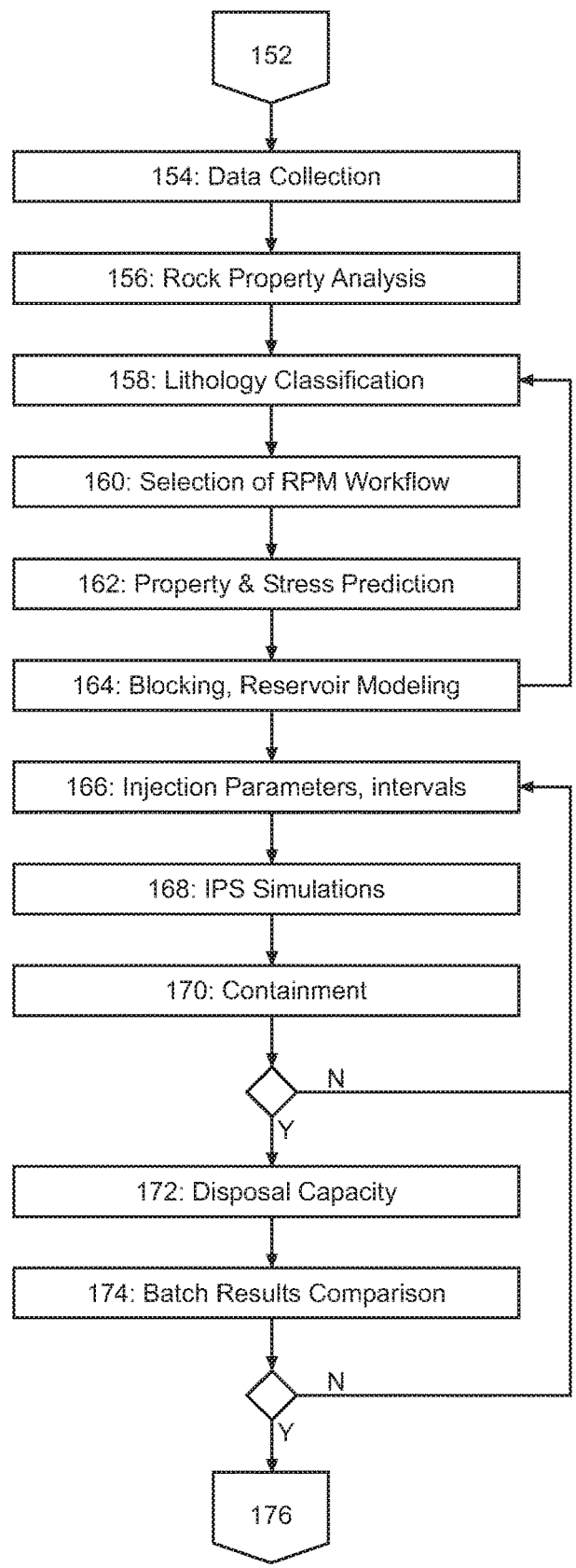
FIG. 3 is a flow chart of an exemplary FEED study, generally designated 150, to determine Geologic Feasibility for a proposed SIF according to an aspect of the disclosure.

FIG. 3 is a flow chart of an exemplary FEED study, generally designated 150, to determine Geologic Feasibility for a proposed SIF according to an aspect of the disclosure.

A method disclosed herein makes use of an Injection Performance Simulator (IPS) to simulate matrix injection and hydraulic fracturing caused by high-pressure injection into subsurface formations. The IPS comprises software executable by a computer and stored in non-transient memory devices and which use engineering models of subsurface flow and deformation combined with estimated or known formation properties to predict the effect of changes in one or more FEED parameter on the short-term and long-term performance of the disposal well. The IPS results can be used to forecast potential well operations (and costs).

The IPS forecasts the creation of one or more hydraulic fractures caused by fluid injection under pressure. Further, the IPS produces optimal injection parameters, and in some embodiments well designs, that maximize stored waste volumes while assuring containment of the created hydraulic fractures within the target zone.

An exemplary method begins at step 152. At step 154, necessary data is collected (and potentially organized, translated, etc.) and/or stored, and input to or made retrievable by the IPS software. The IPS can access one or more databases of data for existing wells and geologic parameters in the selected area around the proposed SIF. Data can be accessed from and stored in local or remote, networked or cloud-based databases. Preferably, the method is executed on one or more local or networked computers, operated in series and/or parallel, enabling the operator to compare, contrast, and study FEED study results from one or multiple well plans within an accelerated timeframe.

The size of the selected area depends on one or more of the following: governmental regulations, the geologic basin of interest, the extent potential zones are identifiable and contiguous, and the extent one or more suitable formations exist for the proposed injection operation and disposal.

The IPS, in some embodiments, provides analysis on one or multiple physical "scales," preferably simultaneously. Namely, analysis is performed at a regional or "play scale," where formations and strata have been characterized by prior geologic studies or where regional stress and faulting is predetermined. Analysis at a "field scale" is provided where suitable offset well data (e.g., from neighboring wells, similar wells, etc.). Where offset well data is sufficient, it is used as a surrogate or proxy for the proposed disposal well. Analysis at the "well scale" uses detailed measurements of the zonal rock properties impacting fluid flow and solids transport (e.g., elastic and mechanical properties, permeability, porosity, cementation, natural fractures, etc.) to determine how the geologic zones of interest will respond to slurry injection.

Where offset injection wells exist, the IPS uses their data from performed injection operations, such as, daily injection volumes, maximum attained pressures, and other data. Such data can evidence good or bad "injectability" in a zone or other well-performance metrics as observed in the injection operations in offset wells.

Rock Property Calculators

In some embodiments, the method performed by the IPS includes performing Rock Property Analysis at 156 using rock property calculations based on offset well data (and/or from the disposal well, if existing). The well data is used as inputs and the IPS determines rock properties for the geologic zones of interest.

The Rock Property Analysis requires data including, at a minimum, a lithological well log sequence by depth. Additional well logs, including gamma ray, bulk density, neutron porosity, density porosity, compressional and shear slowness, can be used to increase the accuracy or level of certainty of the output rock properties. Accuracy and reliability obviously impacts the same characteristics of the optimization results from the IPS method.

The Rock Property Analysis 156 uses a combination of one or more well logs, Rock Physics Models (RPM), reservoir models, and other geologic data to automatically generate a geomechanical earth model. Each Rock Physics Model (RPM) consists of one or more functional relationships whose arguments include one or more input logs and input parameters and whose outputs include one or more output logs and output parameters. The RPM outputs' quality and level of certainty depends on the availability and quality of the input logs and input parameters. To increase the quality of the output logs, RPMs may be constructed to depend explicitly on the observed rock lithology. The quality of the Rock Property Analysis, in turn, also depends on the selection of which RPMs at 160 are used and how they are formulated.

In one case, Rock Property Analysis utilizes gamma ray well log readings along the measured depth of one or more offset wells to create a surrogate or proxy well log along the trajectory of the proposed disposal well. While gamma ray is useful to identify and discriminate between shale, sand, and shaley-sand intervals, additional petro-physical analyses and/or well log types are used in a preferred method to determine parameters of zones composed of carbonate, anhydrite, and other lithology. In particular, well logs for the bulk density, neutron porosity, density porosity, compressional and shear slowness (inverse sound speeds) are often available and can be used in the Rock Property Analysis to augment determination of lithology and petro-physical properties. In addition, references in academic and trade literature can be used to clarify Rock Property Analysis.

Lithology Classifier

The IPS Rock Property Analysis, in some embodiments, uses a "lithology classifier" at 158 to categorize the lithology for each geologic zone along a proxy well log. The classifier is a computer-operated algorithm that uses well logs as input to create a multi-dimensional target space. In a simple form, the target space is a partitioning of a two-dimensional, cross-plot of the input log types defining the corresponding axes. The measured data from each of the input logs is a set of realizations derived from measurements taken along a portion of the wellbore or from multiple snapshots in time. The realizations from two input logs generate a set of points in this two-dimensional space. A variety of target spaces can be defined using one or more input log types and can be defined in one or more dimensions. The computer-modelled target space is fully "covered," so no region in the space is left out of the partitioning.

Each partition is identified with a particular lithology class using a set of empirical or expected rules. For example, empirical data from neighboring offset wells may indicate that the lithology at the analyzed well may be well-characterized over a particular range of depths using certain combinations of input logs which vary over a fixed range, which in turn defines a partition. A rule is then used to identify a many-to-one mapping: from the set of realizations of input log values (whose combination sits within the partition) to the previously determined lithology. Once the combinations of input logs are uniquely partitioned, each measured depth (for example) can be identified with a particular lithology. The input well logs can also be averaged over varying lengths so that the equivalent layers' average values can be assigned to a particular lithology. This scenario is useful in the case of identifying contiguous layers of rock that may be associated with a particular subsurface formation that is known and or has been previously identified by experts (e.g., the Wilcox group of sands, Eagle Ford shale, etc.).

Additional rules are defined based on measured distance between partitions, which are then used to associate a certain class of lithology with each realization. Training algorithms can be applied to enable the lithology classifier to identify rules following patterns observed in the input log data for which a subset has previously been associated with one or more lithology.

Figure 4:
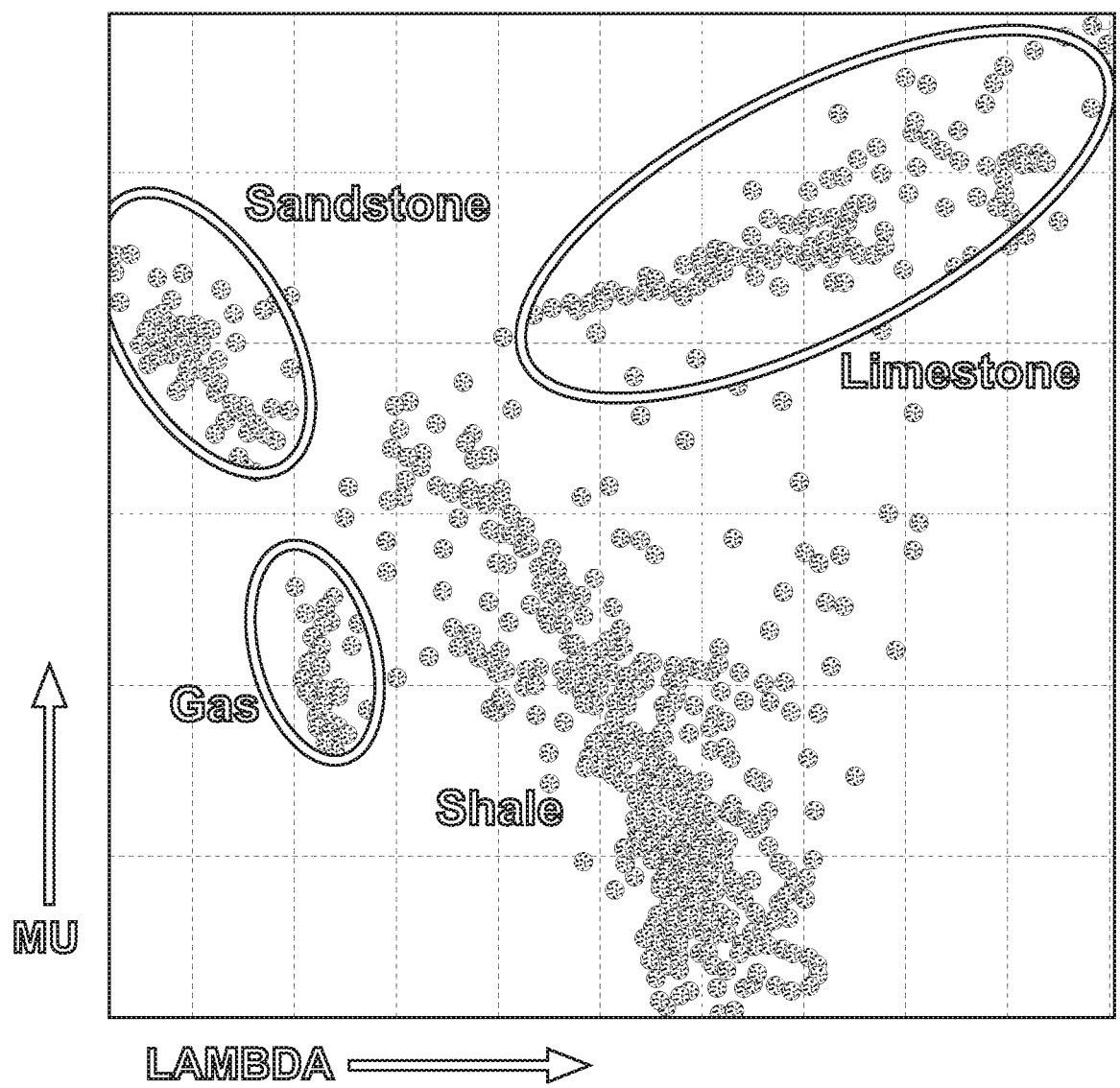
FIG. 4 is an exemplary chart indicating lithology of plotted well log data points according to an aspect of the disclosure.

FIG. 4 is an exemplary chart indicating lithology of plotted well log data points according to an aspect of the disclosure. In this example, the parameters "lambda" and "mu" (characterizing the rock's elastic volumetric and shear moduli, respectively) are cross-plotted for a group of rock samples of varying lithology. A separate analysis of the rock samples was also performed to determine the lithology of each sample. The cross-plot indicates that rock samples with similar lithology tend to be grouped together when certain target spaces are considered as indicated in FIG. 4 by circled clusters for limestone, sandstone, gas and shale lithology. A significant, non-trivial extrapolation of this result is applied by the lithology classifier to partition the target space and classify one or more combinations of input log values, which are then considered as representing a the properties of a series of rock samples along the wellbore.

As another example, compressional sound speed and bulk density well log data at each point along the proposed well trajectories are cross-plotted in a two-dimensional plot whose axes are "compressional sound speed" and "bulk density." Input logs characterize the bulk density and compressional sound speed at multiple points (i.e., at multiple measured depths) along the wellbore. For each measured depth, there is a data point consisting of: (bulk density, compressional sound speed). The data points are created and the set of points are cross-plotted. Each data point falls into a particular region or partition that has been pre-identified with a known lithology. Well logs can also be averaged over varying lengths so that the equivalent layers' average values (e.g., of bulk density and compressional sound speed) can be assigned to a particular lithology.

Once the lithology for the proxy well log has been determined at depths of interest, the Rock Property Analysis optimally chooses one or more RPMs to determine the best forecast for the desired rock property that is possible given the provided input logs. The outputs from one or more RPMs may be used as the inputs to other RPMs, and this workflow, which may include both parallel and series connections between RPMs, is followed from the beginning (given the original input logs) to the end (providing a forecast of the desired output logs).

Rock Property and Stress Predictions

The method at 162 provides rock property and stress predictions, in the form of additional well logs, for the targeted disposal zone and at least one boundary zone. The geomechanical model contains a point-wise description of the lithology and rock properties along the proposed well trajectory, including permeability, porosity, parameters describing leak-off, etc.).

Methods of Reservoir Modelling

The method at 164 leads to an effective, "blocked" (or up-scaled) version of the rock property and stress logs. More complex methods, according to some embodiments, automatically generate two-dimensional or three-dimensional reservoir computer models at the proposed disposal well. The reservoir models can be derived directly from the point-wise description of the lithology and rock properties along the proposed well (resulting in a "layered" three-dimensional geomechanical model), can utilize geological statistical methods to extrapolate rock properties between known wells, or can utilize other methods to populate the reservoir model properties. The derived rock properties can include Young's modulus, Poisson's ratio, permeability, minimum horizontal stress, and fracture break-down pressure (along with corresponding gradients with respect to depth) along the proposed well.

When using a "layered" three-dimensional model, the geomechanical earth volume is divided into contiguous, stacked layers. Each layer is assigned geomechanical properties, the values of which are the average of those previously derived for the proxy well log over the depth of that layer. The beginning and ending depths are chosen automatically by an iterative "blocking" algorithm that applies criteria based on the statistical variability of the well log data over any given interval. In general, applying the blocking algorithm to each well log separately leads to a distinct set of contiguous layers for each well log. The difference between these sets is often indicative of the fact that certain types of well logs are sensitive to different geology features, and so, are used to highlight potential changes in lithology. Ultimately, a single set of contiguous layers is used to describe the geologic zones along the proposed well, and all well logs are "re-blocked" on these intervals prior to generating the final model indicating resulting rock properties.

Blocking and reservoir modelling may require a return to earlier steps, such as 158, depending on performance.

Perforation Intervals, Disposal Capacity

The software identifies perforation intervals 60 within the injection zone 42 which maximize the amount of disposed waste while still maintaining zonal containment. Key to this selection process is also the well design. This maximum potential disposal is referred to as the Disposal Capacity of the Injection Zones. Some selections of perforation intervals can lead to loss-of-containment and should be avoided. Other intervals tend to lower the cost of well development while still optimizing desired behaviors of fractures created during injection. Multiple perforated intervals (and injection zones) can be utilized, simultaneously or sequentially, to optimize fracturing and disposal.

Injection Simulation

Zones suitable for injection are pre-identified by the operator or automatically identified by the IPS program. The results of injecting into particular zones are determined using the geomechanical model (described above) and simulations of slurry transport within the wellbore, slurry entry into the surrounding rock, fracture growth, and reservoir pressure transient behavior (described below). An initial set of injection parameters (e.g., injection flow rate, slurry properties, injection times, etc.), perforation intervals, and well design is selected at 166.

Once a set of potential injection zones and perforation intervals are identified, the IPS program at 168, in an embodiment of the method, simulates injections of potential injection slurry batches, and determines fracture, zonal, and disposal slurry behaviors. The simulated injection is performed for a selected set of parameters, namely, selected injection zone(s) adjacent selected boundary zone(s), selected perforation interval(s), selected injection operational parameters (injection pressures, durations, etc.), and selected waste slurry properties (density, viscosity, solids characteristics, etc.). Multiple simulations are run to reach optimal slurry, well, and operational parameters for maximizing waste disposal while maintaining containment.

For example, the program can simulate a selected, initial Batch Injection wherein the slurry injection begins at zero flow rate, follows a pre-determined injection schedule, and then falls back to zero flow rate for some time period. The simulated injection ceases for a rest period, during which time fluid pressures in the injection and surrounding zones decrease as the injected slurry flows from regions near the well and fractures to regions further away. Each simulated Batch Injection is followed by such a rest period according to a Batch Design provided by the IPS. A series of Batch Cycles is executed by the IPS program.

The initial Batch Injection is followed by subsequent, simulated Batch Injections with modified parameters and/or properties. For example, subsequent batches can be simulated having lower (or no) solid content relative to the initial Batch. Subsequent Batches are run with one or more modified operating parameters (e.g., injection rate, injection duration, resting duration, slurry viscosity, slurry solids concentration, etc.). The plurality of simulations results in a corresponding plurality of simulation results or outputs, namely, zone behaviors (e.g., fracture growth, permeability changes, increasing minimum horizontal stress, etc.) and a quantified volume of disposed slurry.

System-Level Descriptions to Simulate Reservoir Behaviors

To accommodate a variety of well designs, the IPS can use system-level descriptions of the well design, perforated intervals, injection zones, and geomechanical earth model to forecast a variety of reservoir and injection behaviors. A system-level description of the simulation environment refers to the manner in which the separate simulators are treated, in this case as a combined series and parallel network of modular algorithms, each of which may provide feedback to other parts of the network. Each module represents a node in the network that identifies a set of inputs and outputs, and the IPS contains a variety of algorithms that satisfy the requirements for each node, even though the algorithms themselves may otherwise produce significantly different behavior based on their definition. The modular approach allows on-the-fly replacement of algorithms to test various functional dependencies in an automated fashion and dictated by the computer program itself during the iterative process disclosed herein.

For example, the IPS can use a system-level description of complex fluid transport, including fluid motion, variable solids concentration, variable fluid rheology, and solid particulate settling and transport along an arbitrary well trajectory (and well design).

Similarly, the IPS can use a system-level description of partitioning of complex fluids between perforated intervals, leading to distinct, time-varying pressures and flow rates at each perforated interval.

Similarly, the IPS can use a system-level description of Passage of Complex Fluids through the Perforated Intervals into the reservoir through open-hole or mechanical completions modeled by one or more functional relationships between fluid pressure and flow rate.

Similarly, the IPS can use a system-level description of Flow of Complex Fluid and possible fracture growth (and fluid leak-off from inside the fracture) into one or more of the surrounding formations both inside and outside the Injection Zone.

Similarly, the IPS can use a system-level description of time-varying comingling between, or isolation of, injected fluid between multiple Injection Zones, and, in particular, the Disposal Capacity for the combined Injection Zones (which can include permeable strata between them) can or cannot be larger than the Disposal Capacity of the Injection Zones considered separately.

Similarly, the IPS can use a system-level description of time-varying stress interference between one or more fractures emanating from multiple Perforated Intervals or between an injection-induced fracture and a natural fracture.

Similarly, the IPS can use a system-level description of the transition between matrix, diffusion-like flow, to fracture creation and growth once local pore pressure reaches formation break-down or fracture propagation pressure, and the impact of transient injection and reservoir behavior on the mode of injection and partitioning of fluid between Perforated Intervals.

Identification of Feasible Zones, Structural Features, Containment Loss Scenarios There are three key structural features that characterize the suitability of injecting slurry into an injection zone, and these are often distinct from suitable zonal features (e.g., as desired for water disposal injection, enhanced oil recovery, or pressure maintenance). The method, in some embodiments, identifies three loss-of-containment scenarios, the possibility of which have significant impact on slurry injection feasibility. The scenarios are characterized by differing minimum horizontal stress, permeability, and rock stiffness of the boundary layer above the injection zone (and sometimes of the boundary layer below). The described scenarios are not exhaustive but are commonly identified in operational, environmental, or regulatory issues since slurry in the injection zone can pass to shallower depths.

A first containment scenario is Fracture Containment due to overlying zonal layer pressure constraint. In high-pressure injection operations, where waste slurry (or other fluid) is injected into the injection zone, the overlying zonal layers act to constrain pressure-induced fracture growth within the injection zone. The software program predicts fracture growth using the predicted minimum horizontal stress of the boundary layer and determines a minimum pressure in the injection zone below the upper boundary zone resulting in extending fractures into the boundary zone. Alternately, the program identifies a maximum pressure which can be generated in the injection zone below the upper boundary zone without causing breach of containment by creating fractures extending into the upper boundary zone.

A second containment scenario to consider is Fluid Containment due to relative permeability of overlying zonal layers compared to that observed in the injection zone. The IPS utilizes the permeability in the zonal layers and injection zone to determine how quickly the fluid pressure generated during injection is relieved, whether this occurs far away from the well and or above or below the injection zone. In cases where the overlying zone rock is much less permeable than the injection zone, the injected slurry is less likely to breach containment and migrate outside the injection zone during conditions of matrix injection (i.e., when no fracture is created). Fractured injection is different, however, in that Fluid Containment is expected to occur (or at least contribute to the overall likelihood of containment) when the permeability in the overlying zonal layers are much larger than the permeability in the injection zone (e.g., when this ratio is a factor of ten or more). In that case, fracture(s) in the injection zone may propagate up to the overlying zone but then cease upward propagation as the fluid pressure inside the fracture(s) is released relatively quickly into the overlying zone.

A third containment scenario to consider if Stiffness Containment. Stiffness containment occurs where the overlying zone rock is of higher stiffness than the injection zone. In such a case, fractures created during slurry injection are more likely to remain pinned to the zone just below the containing layer since application of additional and or continue fluid pressure within the injection zone will more likely cause fracture length growth (below the boundary layer) rather than fracture width growth (into the boundary layer). Although the actual fracture orientation is governed by the orientation of the principal stresses in the rock (as well as other reservoir properties and features of propagation) and so may be in any direction, typical subsurface stresses are oriented such that fracture height grows in the vertical direction, whereas fracture width and length are aligned in the horizontal directions.

The method can further include at 170 a feedback loop and iterative calculation to continually optimize the available parameters (e.g., injection flow rate, slurry viscosity, slurry density, etc.) in order to prevent these loss of containment scenarios from occurring.

Disposal Capacity, Domain Capacity Calculations

The Disposal Capacity for a waste injection well is determined by the IPS at 172. In an embodiment, the IPS uses the geomechanical earth model and injection simulation results to predict principal stress increases within the zones during the disposal process. Each Batch Cycle deposits a certain volume of particulate solids that remain inside one or more created fractures after each cycle. This change in volume causes a change (typically an increase) in the overall stress within the injection zone and boundary zones formations above and below it.

The stress containment scenario outlined above is achieved when the difference between the minimum horizontal stress in the containing zone is larger than the stress in the zone below it. The stiffness containment scenario also lends itself to effective measure of required stress to propagate a slurry-laden fracture through the containing layer.

The IPS provides techniques for determining how subsequent Batch Cycles can increase the minimum horizontal stress below the containment layer and how many Batch Cycles (and of what volume and characteristics) can be injected before the minimum horizontal stress in the containment layer no longer prevents loss of containment. This number is referred to as the Total Number of Batches. The IPS program forecasts injection into one or more injection zones, simultaneously or sequentially, and provides a direct estimate of the contribution of each injection zone to overall Disposal Capacity. The method can include a feedback loop to automatically (or upon request) update the Batch Design and selection of Injection Zones and Perforated Intervals to maximize Disposal Capacity based on the IPS results from multiple Batch Designs.

The resulting outputs are mathematically compared at 174, preferably as they are completed, with outputs of other simulations as part of finding an optimum Batch Design which maximizes selected outputs (e.g., disposal capacity). Such comparisons inform selection of parameters for future simulations, resulting in iterative simulations approaching an optimal Batch Design. Iterative and convergence algorithms are known in the art and can be applied to reduce calculation times, limit necessary simulation runs, etc. Convergence algorithms can take various forms, for example, evolutionary algorithms, genetic algorithms, meta-heuristic optimization algorithms, trial-and-error, linear and non-linear optimization techniques, least squares regression, etc. In case no satisfactory solution is obtained (e.g., when none of the batch designs ensures containment), none of the results are considered as potential candidates and none is therefore optimum. In case one or more solutions obtained are indeed satisfactory, these solutions are carried forward in the FEED with their relative disposal capacities and evaluated in concert with the other FEED criteria to determine the overall optimum batch design to use in practice.

The iterative simulation approach requires large numbers of simulations and corresponding processing power to be time-effective. The simulations can, in an embodiment, be computed using parallel computing. Parallel computing allows the software to calculate how varied Batch Designs affect Disposal Capacity so optimized operational parameters are provided in an accelerated timeframe. Where real-time data is used, parallel computing can be key in running sufficient simulations and comparing their impacts quickly enough to allow newly-optimized parameters to be executed.

The geologic feasibility ends at block 176 or is repeated in whole or part if feasibility is not achieved.

Operational Feasibility

Figure 5:
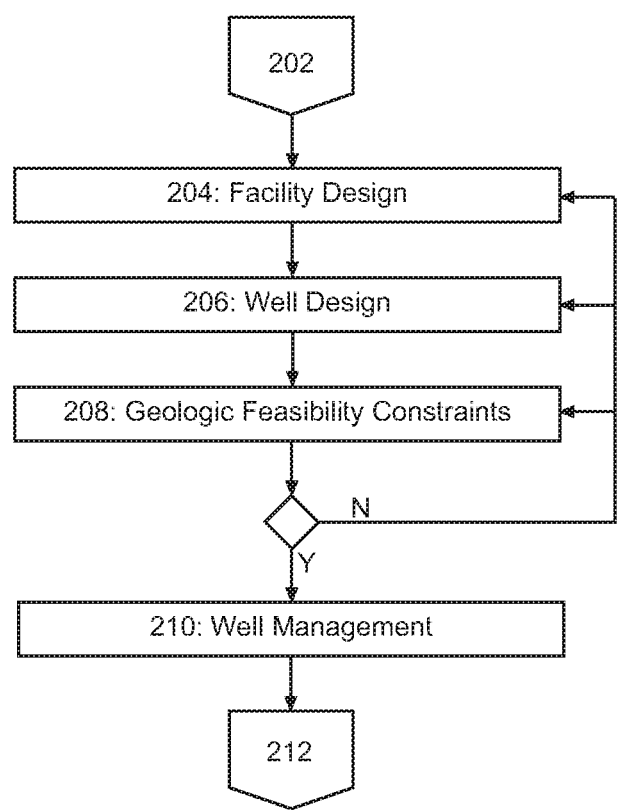
FIG. 5 is a flow chart of an exemplary FEED study, generally designated 200, to determine Geologic Feasibility for a proposed SIF according to an aspect of the disclosure.

FIG. 5 is a flow chart of an exemplary FEED study, generally designated 200, to determine Geologic Feasibility for a proposed SIF according to an aspect of the disclosure.

The exemplary method, starting at 202, illustrated in FIG. 5 indicates that Operational Feasibility considers at least three components impacting operational optimization: Facility Design 204, Well Design 206, and Well Management 208. Each component impacts the proposed Slurry Injection Facility's maximum Disposal Capacity. Consequently, each must be considered simultaneously as part of an iterative process in concert with the design constraints identified by the Geologic Feasibility (described above).

Facility Design 204 constraints ensure that the surface equipment provide enough throughput and storage of the various waste streams to accommodate the proposed Batch Designs and forecast economic conditions. In particular, as variable types and amounts of waste arrive at the site, the method considers volumes to be processed and stored during the timeframes of a Batch Injection and subsequent Rest Period.

Well Design 206 constraints ensure that the selection of proposed well completion and trajectory optimally target one or more injection zones targeted earlier in the IPS program method, namely at the optimization loop indicated at 166 in FIG. 3. In particular, the IPS program forecasts injection-induced fracturing which may interfere with neighboring wells. Similarly, the Well Design can be updated by the IPS program's selection of Perforated Intervals to control and or minimize the risk of loss-of-containment. A set of geologic constraints is applied at 208, with an internal iterative loop is connected back to the Facility Design and Well Design, to ensure consistency with Geologic Feasibility 166.

Well Management System constraints at 210 are utilized such that, once the well is constructed and operational, the program optimizes Disposal Capacity with respect to parameters that can be controlled by operators at the facility site. The feasibility study ends at block 212.

Well Management System

Figure 6:
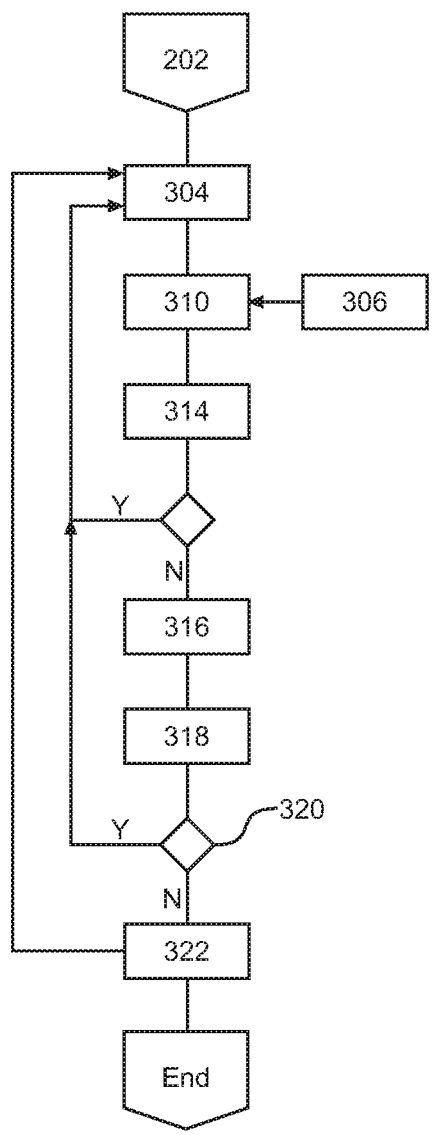
FIG. 6 is a flow chart of an exemplary computerized Well Management System (WMS) method, generally designated 300, to actively and automatically manage an operating waste injection well and waste disposal facility.

FIG. 6 is a flow chart of an exemplary computerized Well Management System (WMS) method, generally designated 300, to actively (and in some embodiments automatically) manage an operating waste injection well and waste disposal facility. The WMS method begins at 302 and depends on existing facility, well and operation designs, which can be provided from the optimized results from previously performed Facility Design 204, Well Design 206, Injection Parameters and Intervals determination 166, and Selected Batch Designs at 174. For clarity, the method is discussed in relation to a disposal injection operation.

In an exemplary WMS method, a disposal injection operation is begun 304, at the well site, according to an initial Batch Injection Schedule selected and predicted to maintain zonal containment of the injected slurry and/or optimize disposal volume. The operation is performed according to planned operating parameters (e.g., injection pressure, injection pump rates, injection and resting periods, etc.) into a targeted disposal zone of a reservoir which is modelled (e.g., lithography, known fractures, stresses, multi-dimensional space, etc.) in a control computer system. The model reservoir can be taken from the geologic feasibility study explained above.

The well site includes sensor equipment and operational equipment networked to the control system and having controllers, gateways, etc., as described herein above. Smart sensors are utilized to insure accurate and timely communication of real time measured data to the computer control system via the network.

A suite of real time measured data, from the sensor equipment, are input 308 to an injection performance simulator program (such as the IPS program described above). The "live" measured data is communicated to the simulator software and simulations are run at 310, resulting in forecast operation results based on the real time data. The IPS program also utilizes other information 312, such as archived measured data, a computer-modelled reservoir corresponding to the targeted reservoir, a computer-modelled well corresponding to the physical well, and/or a computer-modelled injection schedule corresponding to the Batch Injection Schedule being implemented at the well. The simulations are run sequentially, during well operations (in "real time") with subsequent simulations updated with more recent real time measured data. As described elsewhere herein, the method is preferably performed using parallel computer processors to facilitate speed of simulations and other calculations.

The simulation results are monitored for selected outcomes or indications at 314 and can be compared by the program to previously forecast results using the initial injection operation schedule. Significant deviations from the initial injection schedule forecast can be identified and quantified. Further, expected reservoir behavior, predicted by the computer simulations, might indicate potential loss of containment. That is, slurry or fractures migrating to containment or boundary zones. Further, simulations can be monitored for indications that a greater disposal volume can be achieved during the injection operation. Increased potential volume disposal can result from unanticipated fractures, accelerated slurry dispersal in the zone, etc.

Real-time, near real-time, and the like, as used herein, means of or relating to a system in which data is processed and/or communicated within fractions of a second so that it is available virtually immediately, or of or relating to a data processing system in which a computer receives constantly changing data (such as measured data during an injection procedure) and processes the data sufficiently rapidly to be able to control the implicated equipment (pumps, mixers, valves, etc.).

As described, the IPS program uses the input measured data to run injection operation simulations based on the known and estimated formation parameters, zonal rock properties, lithography, zonal stresses, and modelled reservoir, well, and injection simulations, etc., (if known). The Batch Injection is planned to be performed according to an initial Injection Schedule which sets out operational parameters such as injection flow rates, slurry viscosity, slurry density, injection times, rest times, etc. Often the acceptable injection parameters are supplied in operational ranges. In an embodiment, an initial Injection Schedule is a selected, optimal injection operation resulting from the methods described herein using the IPS program.

Controllable and non-controllable parameters are used by the IPS program. For example, controllable parameters are controllable by the operator during the injection operation, such as injection flow rates, slurry viscosity, slurry density, injection times, rest times, etc. Similarly, non-controllable parameters are identified (e.g., MASIP, regulatory constraints, formation rock strength, etc.) and one or more real-time, measurable data metrics are defined. In an embodiment, the IPS program has input identifying specific operating parameters and metrics that are critical to well performance and to which well behavior is sensitive. These operating parameters are likely candidates for on-the-fly changes during the injection operation since such changes are most likely to provoke meaningful changes in expected well behavior.

An exemplary real time, measurable data metric is an Operating Window, which is defined as the difference between the well MASIP and the dynamic, well-head pressure obtained while pumping at the maximum, scheduled (design) rate. The Operating Window changes over time and in particular during each Batch Cycle. Given that injection must cease when the Operating Window decreases to zero, well management is optimized, according to the IPS program outputs, to ensure that the Operating Window provides a sufficient margin to accommodate the desired disposal volume during the Batch Cycle.

The WMS method utilizes the IPS program to incorporate real-time measured data from the site to predict and respond to changes in identified critical data and simulation output metrics, such as the Operating Window. The IPS program runs updated injection simulations based on the measured real time data. The resulting outputs can identify potential unacceptable outcomes (e.g., loss of containment) and potential improvements to the scheduled injection operation (e.g., an operational parameter change which will result in greater injected waste volume) based on allowed ranges of the measurable data metrics, output results, etc.

Where a selected simulation result occurs (e.g., loss of containment, opportunity for increased disposal volume, etc.), the WMS method or IPS program determines, using iterative simulations, an updated, optimized outcome achieved by an updated, optimized injection schedule at 316.

(Determination of optimal results is addressed elsewhere herein.) The IPS program identifies and quantifies operational parameter changes to make to the initial or currently-running injection operation to achieve the updated injection schedule at 318. The IPS program, to avoid a predicted containment breach, based on simulations using the initial injection schedule updated by real time measured data, calculates one or more changes to make to one or more operational parameters. The parameter changes (e.g., injection rate, pump speed, etc.) correlate to the updated, optimized injection schedule. For example, the IPS program can indicate a new (higher or lower) injection rate (or a proposed change from the initial or current rate).

The IPS program, in an embodiment, provides one or more recommendations to the operator to modify the controllable parameters according to the updated and changed operating parameters and schedule. The operator can then perform tasks to achieve the recommended operational parameter (e.g., slowing injection rate), or, in an alternate embodiment, the operator can receive the change recommendation and either authorize or deny the change at 320. Upon authorization, the WMS program automatically operates injection equipment (e.g., pumps, material handling equipment, valving, etc.) to effect the recommended and authorized change at 322. For example, the WMS program, via the network, communicates to the in-use injection pump, providing instructions to the pump controller to reduce (or increase) the pump rate to a given rate or range. That is, the WMS communicates new parameters to the appropriate equipment, which the equipment performs to effect a real time (or near real time) change in equipment settings or operation. Thus, the WMS program and networked system provide on-the-fly change to operation equipment and parameters, automatically.

Changes can be verified by the WMS and IPS programs using updated real time measured data. After the recommended changes are made to the controllable operational parameters, injection operations continue, back to 304, and the method is performed again, preferably until completion of the initial or updated injection schedule.

The WMS method can also utilize constraints on Controllable Parameters such that the WMS cannot recommend any parameter changes outside of those constraints. This effectively acts as a check on the WMS method and IPS program to prevent wild fluctuation of injection parameters during a Batch Cycle.

In another embodiment, the WMS method can utilize historical behavior of the well (particularly historical data from prior-run Batches), real-time measured from the well site, and planned future Batch Cycles to maximize overall Disposal Capacity of the well across multiple Batch Injections. For example, if a forecast well behavior, based on real time data during an on-going Batch Cycle, indicates permanent damage to the well or reservoir (negatively effecting overall disposal volume), the WMS program can recommend a change in the current Batch Cycle injection schedule to limit or eliminate the potential damage.

Exemplary optimum scenarios are discussed here. Data obtained using the WMS method is included in the IPS to determine, automatically or with operator input, how best to achieve the following identified optimum scenarios.

In case the IPS recommends a single fracture be utilized for disposal, the operator or program manages the Controllable Parameters to create the single fracture using one Perforated Interval, and preferably re-use that fracture during subsequent Batch Injections.

In case the IPS recommends a sequence of fractures be utilized for disposal, the operator or program manages the Controllable Parameters to create one or more fractures along one Perforated Interval. The created, multiple fractures are preferably re-entered by injected slurry in future Batch Injections. Alternately, one or more new fractures can be created during subsequent Batch Injections.

In case the IPS recommends multiple fractures be simultaneously used for disposal, the operator or program includes multiple Perforated Intervals in the Well Design, and manages the Controllable Parameters so flow into each Perforated Interval is balanced according to an optimal Batch Design. The created, multiple fractures can be preferably re-used in one or more subsequent Batch Injections. Alternately, new fractures can be created during subsequent Batch Injections.

To ensure optimization is achieved, the impacts of both actual and simulated Batch Injections are evaluated concurrently with the well operation. Batch Design solutions from the IPS are adopted which forecast desirable reservoir behavior, and data-based metrics from the Well Management System are used to continually update the IPS and confirm the predicted behavior.

Exemplary Determined Parameters

Certain embodiments of the methods and systems disclosed herein have been performed to evaluate the methods and systems. In particular, the methods have been applied to thirty-four geologic formations in various basins across the United States. In all of these cases, the optimized Batch Injection design consists of an injection rate between 1 and 20 Bbls/min (bpm), injection duration between 1 and 144 hours (hrs), slurry viscosity between 1 and 35 centipoise (cP), solids concentration between 0 and 35%, with solids particle size in the slurry of less than 400 microns; the optimized Rest Period is between 1 and 144 hrs; and the optimized MASIP is defined so that the bottom-hole pressure (BHP) at the optimal injection rate is above the fracture break-down pressure, which is often observed to have a gradient of between 0.3-1.0 psi/ft at the depth of given Injection Zones. More preferable ranges for these parameters can be forecast by the IPS program to provide maximized Disposal Capacities for the particular formations of interest.

Where the target geological formation is the Wilcox formation, the optimized Batch Injection design consists of injection rate preferably between 3 and 12 bpm, injection duration preferably between 8 and 24 hrs, slurry viscosity preferably between 10 and 30 centipoise (cP), solids concentration preferably between 5 and 20%, and Rest Period preferably between 3 and 18 hrs.

Where the target formation is the Edwards formation, the optimized Batch Injection design consists of injection rate preferably between 4 and 8 bpm, injection duration preferably between 6 and 24 hrs, slurry viscosity preferably between 15 and 30 cP, solids concentration preferably between 12 and 20%, and Rest Period preferably between 6 and 24 hrs.

Where the target formation is the Delaware Basin formation, the optimized Batch Injection design consists of injection rate preferably between 3 and 10 bpm, injection duration preferably between 6 and 28 hrs, slurry viscosity preferably between 20 and 30 cP, solids concentration preferably between 8 and 15%, and Rest Period preferably between 4 and 24 hrs.

Where the target formation is the Wolfcamp formation, the optimized Batch Injection design consists of injection rate preferably between 3 and 12 bpm, injection duration preferably between 4 and 28 hrs, slurry viscosity preferably between 20 and 30 cP, solids concentration preferably between 12 and 20%, and Rest Period preferably between 6 and 36 hrs.

Where the target geological formation is the Minnelusa formation, the optimized Batch Injection design consists of injection rate preferably between 4 and 9 bpm, injection duration preferably between 6 and 24 hrs, slurry viscosity preferably between 15 and 30 centipoise, solids concentration preferably between 2 and 15%, and Rest Period preferably between 6 and 18 hrs.

Where the target geological formation is the Dakota Sands formation, the optimized Batch Injection design consists of injection rate preferably between 4 and 15 bpm, injection duration preferably between 3 and 24 hrs, slurry viscosity preferably between 15 and 30 centipoise, solids concentration preferably between 5 and 20%, and Rest Period preferably between 6 and 36 hrs.

Where the target formation is the Mission Canyon formation, the optimized Batch Injection design consists of injection rate preferably between 6 and 12 bpm, injection duration preferably between 6 and 26 hrs, slurry viscosity preferably between 20 and 30 cP, solids concentration preferably between 5 and 15%, and Rest Period preferably between 3 and 18 hrs.

Where the target formation is the Arbuckle formation, the optimized Batch Injection design consists of injection rate preferably between 4 and 14 bpm, injection duration preferably between 6 and 18 hrs, slurry viscosity preferably between 20 and 30 cP, solids concentration preferably between 5 and 20%, and Rest Period preferably between 4 and 24 hrs.

Where the target formation is the Ellenburger formation, the optimized Batch Injection design consists of an injection rate between 4 and 12 bpm, injection duration preferably between 6 and 24 hrs, slurry viscosity preferably between 15 and 30 cP, solids concentration preferably between 12 and 20%, and Rest Period preferably between 16 and 48 hrs.

Where the target formation is the Clear Fork formation, the optimized Batch Injection design consists of injection rate preferably between 3 and 10 bpm, injection duration preferably between 3 and 24 hrs, slurry viscosity preferably between 10 and 30 cP, solids concentration preferably between 8 and 25%, and Rest Period preferably between 4 and 72 hrs.

Where the target formation is the Rustler formation, the optimized Batch Injection design consists of injection rate preferably between 6 and 12 bpm, injection duration preferably between 12 and 38 hrs, slurry viscosity preferably between 20 and 30 cP, solids concentration preferably between 5 and 20%, and Rest Period preferably between 12 and 28 hrs.

Where the target formation is the Sparta formation, the optimized Batch Injection design consists of injection rate preferably between 4 and 11 bpm, injection duration preferably between 6 and 48 hrs, slurry viscosity preferably between 10 and 30 cP, solids concentration preferably between 8 and 22%, and Rest Period preferably between 6 and 18 hrs.

Where the target formation is the Woodbine formation, the optimized Batch Injection design consists of injection rate preferably between 2 and 10 bpm, injection duration preferably between 2 and 48 hrs, slurry viscosity preferably between 20 and 30 cP, solids concentration preferably between 4 and 20%, and Rest Period preferably between 12 and 48 hrs.

Where the target formation is the Frio formation, the optimized Batch Injection design consists of injection rate preferably between 4 and 15 bpm, injection duration preferably between 3 and 48 hrs, slurry viscosity preferably between 10 and 30 cP, solids concentration preferably between 12 and 30%, and Rest Period preferably between 6 and 48 hrs.

Where the target formation is the Clayton formation, the optimized Batch Injection design consists of injection rate preferably between 6 and 12 bpm, injection duration preferably between 2 and 24 hrs, slurry viscosity preferably between 15 and 30 cP, solids concentration preferably between 5 and 20%, and Rest Period preferably between 6 and 18 hrs.

Where the target formation is the Corral Creek formation, the optimized Batch Injection design consists of injection rate preferably between 3 and 9 bpm, injection duration preferably between 6 and 24 hrs, slurry viscosity preferably between 20 and 30 cP, solids concentration preferably between 12 and 20%, and Rest Period preferably between 12 and 48 hrs.

Where the target formation is the Hawkeye formation, the optimized Batch Injection design consists of injection rate preferably between 5 and 12 bpm, injection duration preferably between 7 and 36 hrs, slurry viscosity preferably between 10 and 30 cP, solids concentration preferably between 12 and 22%, and Rest Period preferably between 12 and 38 hrs.

Where the target formation is the Bailey formation, the optimized Batch Injection design consists of injection rate preferably between 3 and 12 bpm, injection duration preferably between 6 and 24 hrs, slurry viscosity preferably between 15 and 30 cP, solids concentration preferably between 8 and 18%, and Rest Period preferably between 4 and 72 hrs.

Where the target formation is the Mt. Simon formation, the optimized Batch Injection design consists of injection rate preferably between 5 and 15 bpm, injection duration preferably between 4 and 30 hrs, slurry viscosity preferably between 20 and 30 cP, solids concentration preferably between 12 and 20%, and Rest Period preferably between 6 and 72 hrs.

Where the target formation is the Devonian formation, the optimized Batch Injection design consists of injection rate preferably between 3 and 11 bpm, injection duration preferably between 6 and 24 hrs, slurry viscosity preferably between 10 and 30 cP, solids concentration preferably between 5 and 20%, and Rest Period preferably between 4 and 48 hrs.

Where the target geological formation is the Bone Spring formation, the optimized Batch Injection design consists of injection rate preferably between 6 and 12 bpm, injection duration preferably between 2 and 40 hrs, slurry viscosity preferably between 15 and 30 centipoise, solids concentration preferably between 5 and 25%, and Rest Period preferably between 6 and 18 hrs.

Where the target formation is the Newburg formation, the optimized Batch Injection design consists of injection rate preferably between 5 and 12 bpm, injection duration preferably between 3 and 32 hrs, slurry viscosity preferably between 20 and 30 cP, solids concentration preferably between 5 and 20%, and Rest Period preferably between 4 and 24 hrs.

Where the target formation is the Queen formation, the optimized Batch Injection design consists of injection rate preferably between 3 and 11 bpm, injection duration preferably between 3 and 24 hrs, slurry viscosity preferably between 10 and 30 cP, solids concentration preferably between 8 and 22%, and Rest Period preferably between 6 and 18 hrs.

Where the target geological formation is the San Andreas formation, the optimized Batch Injection design consists of injection rate preferably between 4 and 15 bpm, injection duration preferably between 6 and 24 hrs, slurry viscosity preferably between 15 and 30 centipoise, solids concentration preferably between 12 and 20%, and Rest Period preferably between 6 and 48 hrs.

Where the target formation is the Yeso formation, the optimized Batch Injection design consists of injection rate preferably between 3 and 12 bpm, injection duration preferably between 5 and 38 hrs, slurry viscosity preferably between 20 and 30 cP, solids concentration preferably between 5 and 25%, and Rest Period preferably between 3 and 18 hrs.

Where the target formation is the Ohio Shale formation, the optimized Batch Injection design consists of injection rate preferably between 6 and 12 bpm, injection duration preferably between 6 and 24 hrs, slurry viscosity preferably between 10 and 30 cP, solids concentration preferably between 5 and 20%, and Rest Period preferably between 4 and 18 hrs.

Where the target formation is the Trempealeau Dolomite formation, the optimized Batch Injection design consists of injection rate preferably between 5 and 10 bpm, injection duration preferably between 4 and 32 hrs, slurry viscosity preferably between 5 and 30 cP, solids concentration preferably between 12 and 25%, and Rest Period preferably between 6 and 26 hrs.

Where the target formation is the Big Injun formation, the optimized Batch Injection design consists of injection rate preferably between 3 and 9 bpm, injection duration preferably between 3 and 18 hrs, slurry viscosity preferably between 5 and 30 cP, solids concentration preferably between 5 and 20%, and Rest Period preferably between 6 and 24 hrs.

Where the target formation is the Geneso formation, the optimized Batch Injection design consists of injection rate preferably between 2 and 12 bpm, injection duration preferably between 6 and 24 hrs, slurry viscosity preferably between 10 and 30 cP, solids concentration preferably between 5 and 22%, and Rest Period preferably between 6 and 40 hrs.

Where the target formation is the Weir formation, the optimized Batch Injection design consists of injection rate preferably between 3 and 12 bpm, injection duration preferably between 8 and 52 hrs, slurry viscosity preferably between 15 and 30 cP, solids concentration preferably between 10 and 25%, and Rest Period preferably between 6 and 28 hrs.

Where the target formation is the Knox formation, the optimized Batch Injection design consists of injection rate preferably between 6 and 12 bpm, injection duration preferably between 4 and 24 hrs, slurry viscosity preferably between 20 and 30 cP, solids concentration preferably between 4 and 20%, and Rest Period preferably between 6 and 32 hrs.

Where the target formation is the Cliffton Forge/Medina formation, the optimized Batch Injection design consists of injection rate preferably between 4 and 12 bpm, injection duration preferably between 8 and 24 hrs, slurry viscosity preferably between 10 and 30 centipoise, solids concentration preferably between 8 and 20%, and Rest Period preferably between 4 and 18 hrs.

Where the target formation is the Gordon formation, the optimized Batch Injection design consists of injection rate preferably between 3 and 11 bpm, injection duration preferably between 6 and 28 hrs, slurry viscosity preferably between 20 and 30 cP, solids concentration preferably between 5 and 23%, and Rest Period preferably between 8 and 18 hrs.

Where the target formation is the Oriskany formation, the optimized Batch Injection design consists of injection rate preferably between 3 and 12 bpm, injection duration preferably between 12 and 72 hrs, slurry viscosity preferably between 10 and 30 cP, solids concentration preferably between 12 and 20%, and Rest Period preferably between 2 and 24 hrs.

Method

The disclosure is provided in support of the methods claimed or which may be later claimed. Specifically, this support is provided to meet the technical, procedural, or substantive requirements of certain examining offices. It is expressly understood that the portions or actions of the methods can be performed in any order, unless specified or otherwise necessary, that each portion of the method can be repeated, performed in orders other than those presented, that additional actions can be performed between the enumerated actions, and that, unless stated otherwise, actions can be omitted or moved. Those of skill in the art will recognize the various possible combinations and permutations of actions performable in the methods disclosed herein without an explicit listing of every possible such combination or permutation. It is explicitly disclosed and understood that the actions disclosed, both herein below and throughout, can be performed in any order (xyz, xzy, yxz, yzx, etc.) without the wasteful and tedious inclusion of writing out every such order.

Computerized Systems and Components

Computer and Computerized Systems. The systems, methods, and other embodiments according to the disclosure include computerized systems requiring the performance of one or more methods or steps performed on or in association with one or more computer.

The term computer as used herein and in the claims is not and is not intended to be a means-plus-function term or element. A computer is a programmable machine having two principal characteristics, namely, it responds to a set of instructions in a well-defined manner and can execute a pre-recorded list of instructions (e.g., a program). A computer according to the present disclosure is a device with a processor and a memory. For purposes of this disclosure, a computer includes a server, a personal computer, (i.e., desktop computer, laptop computer, netbook), a mobile communications device, such as a mobile "smart" phone, and devices providing functionality through internal components or connection to an external computer, server, or global communications network (such as the internet) to take direction from or engage in processes which are then delivered to other system components.

Those of skill in the art recognize that other devices, alone or in conjunction with an architecture associated with a system, can provide a computerized environment for carrying out the methods disclosed herein. The method aspects of the disclosure are computer implemented and, more particularly, at least one step is carried out using a computer.

General-purpose computers include hardware components. A memory or memory device enables a computer to store data and programs. Common storage devices include disk drives, tape drives, thumb drives, and others known in the art. An input device can be a keyboard, mouse, hand-held controller, remote controller, a touchscreen, and other input devices known in the art. The input device is the conduit through which data and instructions enter a computer. An output device is a display screen, printer, or other device letting the user sense what the computer has accomplished, is accomplishing, or is expected to accomplish. A central processing unit (CPU) is the "brains" of the computer and executes instructions and performs calculations. For example, typical components of a CPU are an arithmetic logic unit (ALU), which performs arithmetic and logical operations and a control unit (CU) which extracts instructions from memory, decodes and executes them, calling on the ALU when necessary. The CPU can be a micro-processor, processor, one or more printed circuit boards (PCBs). In addition to these components, others make it possible for computer components to work together or in conjunction with external devices and systems, for example, a bus to transmit data within the computer, ports for connectivity to external devices or data transmission systems (such as the internet), wireless transmitters, read and read-write devices, etc., such as are known in the art.

A server is a computer or device on a network that manages network resources. There are many different types of servers, including remote, live and network access servers, data servers, member servers, staging servers, etc. A server can be hardware and/or software that manages access to a centralized resource or service in a network. For purposes of this disclosure, the term "server" also includes "virtual servers" which can be hosted on actual servers.

A computer network or data network is a communications network allowing computers to exchange data, with networked devices passing data to each other on data connections. Network devices that originate, route, and terminate data are called nodes. The connections (links) between nodes are established using wire or wireless media. Nodes can include hosts, such as PCs, phones, servers, and networking hardware. Devices are networked together when one device is able to exchange information with the other device whether or not they have a direct connection to each other. Computer networks support applications such as access to the World Wide Web (WWW) or internet, shared use of application and storage servers, printers, and use of email and instant messaging applications. Computer networks differ in the physical media to transmit signals, protocols to organize network traffic, network size, topology, and organizational intent.

A (control) gateway is a network node that acts as an entrance to another network. In homes, the gateway is the ISP (internet service provider) that connects the user to the internet. In enterprises, the gateway node often acts as proxy server and firewall. The gateway is also associated with a router, which uses headers and forwarding tables to determine where packets are sent, and a switch, which provides the actual path for the packet in and out of the gateway.

A (control) gateway for the particular purpose of connection to identified cloud storage, often called a cloud storage gateway, is a hardware-based and/or software-based appliance located on the customer premises that serves as a bridge between local applications and remote cloud-based storage and are sometimes called cloud storage appliances or controllers. A cloud storage gateway provides protocol translation and connectivity to allow incompatible technologies to communicate transparently. The gateway can make cloud storage appear to be an NAS (network attached storage) filer, a block storage array, a backup target, a server, or an extension of the application itself. Local storage can be used as a cache for improved performance. Cloud gateway product features include encryption technology to safeguard data, compression, de-duplication, WAN optimization for faster performance, snapshots, version control, and data protection.

A "bridge" connects two (local) networks, often connecting a local network using an internet router.

A router forwards data packets along networks and is connected to at least two networks, commonly two LANs, WANs, or a LAN and its ISP's network. Routers are located at "gateways," the places where two or more networks connect. Routers use headers and forwarding tables to determine paths for forwarding packets and use protocols to communicate with each other to configure a route between hosts.

The disclosure includes one or more databases for storing information relating to aspects of the disclosure. The information stored on a database can, for example, be related to a private subscriber, a content provider, a host, a security provider, etc. One of ordinary skill in the art appreciates that "a database" can be a plurality of databases, each of which can be linked to one another, accessible by a user via a user interface, stored on a computer readable medium or a memory of a computer (e.g., PC, server, etc.), and accessed by users via global communications networks (e.g., the internet) which may be linked using satellites, wired technologies, or wireless technologies.

Data services can include applications for data processing, querying, and manipulation. For example, a Structured Query Language (SQL) or commercially available APACHE (trade name) HADOOP (trade name) can be used. Data storage and services can be performed on-site or remotely, accessible via network, and allow a user to access, manage, upload and download data, and query the databases and data services as needed.

In computer networking, "cloud computing" is used to describe a variety of concepts involving a large number of computers connected through a network (e.g., the Internet). The phrase is often used in reference to network-based services, which appear to be provided by real server hardware, but which are in fact served by virtual hardware, simulated by software running on one or more machines. Virtual servers do not physically exist and can therefore be moved around, scaled up or down, etc., without affecting the user.

In common usage, "the cloud" is essentially a metaphor for the internet. "In the cloud" also refers to software, platforms, and infrastructure sold "as a service" (i.e., remotely through the internet). The supplier has actual servers which host products and services from a remote location, so that individual users do not require servers of their own. End-users can simply log-on to the network, often without installing anything, and access software, platforms, etc. Models of cloud computing service are known as software as a service, platform as a service, and infrastructure as a service. Cloud services may be offered in a public, private, or hybrid networks. Google, Amazon, Oracle Cloud, and Microsoft Azure are well-known cloud vendors.

Software as a service (SaaS) is a software delivery model in which software and associated data are centrally hosted on the Cloud. Under SaaS, a software provider licenses a software application to clients for use as a service on demand, e.g., through a subscription, time subscription, etc. SaaS allows the provider to develop, host, and operate a software application for use by clients who just need a computer with internet access to download and run the software application and/or to access a host to run the software application. The software application can be licensed to a single user or a group of users, and each user may have many clients and/or client sessions.

Typically, SaaS systems are hosted in datacenters whose infrastructure provides a set of resources and application services to a set of multiple tenants. A "tenant" can refer to a distinct user or group of users having a service contract with the provider to support a specific service. Most SaaS solutions use a multi-tenant architecture where a single version of the application, having a single configuration (i.e., hardware, operating system, and network) is used by all tenants (customers). The application can be scaled by installation on several machines. Other solutions can be used, such as virtualization, to manage large numbers of customers. SaaS supports customization in that the application provides defined configuration options allowing each customer to alter their configuration parameters and options to choose functionality and "look and feel."

SaaS services are supplied by independent software vendors (ISVs) or Application Service Providers (ASPs). SaaS is a common delivery model for business applications (e.g., office and messaging, management, and development software, and for accounting, collaboration, management information systems (MIS), invoicing, and content management.

SaaS is an advantage to end-users in that they do not need to provide hardware and software to store, back-up, manage, update, and execute the provided software. Since SaaS applications cannot access the user's private systems (databases), they often offer integration protocols and application programming interfaces (API) such as http (hypertext transfer protocol), REST (representational state transfer), SOAP (simple object access protocol), and JSON (JavaScript Object Notation).

Conclusion

The words or terms used herein have their plain, ordinary meaning in the field of this disclosure, except to the extent explicitly and clearly defined in this disclosure or unless the specific context otherwise requires a different meaning. If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces. The terms "and," "or," and "and/or" shall be read in the least restrictive sense possible. Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," "from about a to b," "from approximately a to b," and any similar expressions, where "a" and "b" represent numerical values of degree or measurement) is to be understood to set forth every number and range encompassed within the broader range of values.

While the foregoing written description of the disclosure enables one of ordinary skill to make and use the embodiments discussed, those of ordinary skill will understand and appreciate the existence of variations, combinations, and equivalents of the specific embodiments, methods, and examples herein. The disclosure should therefore not be limited by the above described embodiments, methods, and examples. While this disclosure has been described with reference to illustrative embodiments, this description is not intended to be construed in a limiting sense. Various modifications and combinations of the illustrative embodiments as well as other embodiments of the disclosure will be apparent to persons skilled in the art upon reference to the description. It is, therefore, intended that the appended claims encompass any such modifications or embodiments.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure. The various elements or steps according to the disclosed elements or steps can be combined advantageously or practiced together in various combinations or sub-combinations of elements or sequences of steps to increase the efficiency and benefits that can be obtained from the disclosure. It will be appreciated that one or more of the above embodiments may be combined with one or more of the other embodiments, unless explicitly stated otherwise. Furthermore, no limitations are intended to the details of construction, composition, design, or steps herein shown, other than as described in the claims.

It is claimed:

1. A method for managing an injection operation in a well having a wellbore extending through a target injection zone in a subterranean reservoir, wherein the injection operation is performed according to initial operation parameters having a plurality of operational parameters, the method comprising:
    receiving, at a control computer having a non-transitory memory, a processor, and a software program executable by the control computer, measured injection data, in real time via a computerized network, from sensor equipment at the well;
    simulating, using the program and using the real time measured data, a plurality of injection operations in a computer-modelled reservoir and simulating resulting fracturing of the computer-modelled reservoir;
    predicting, in response to simulating the injection operations and fracturing, potential occurrence of a risk to the injection operation, the reservoir, or the well;
    simulating, using the program, a plurality of modified injection operations in a computer-modelled reservoir and simulating resulting fracturing of the computer-modelled reservoir;
    determining, using the program and based on the simulated modified injection operations and fracturing, at least one desired change to the initial operation parameters to prevent the potential occurrence of a risk; and
    communicating the desired change to the initial operating parameters, via the network, during the injection operation.

2. The method of claim 1, further comprising modifying the injection operation's initial operation parameters in accordance with the determined at least one desired change to the operation parameters, during the on-going injection operation.

3. The method of claim 2, wherein the modification to the operation parameters is automatically performed by surface and well equipment connected to the network in response to communicating the desired change.

4. The method of claim 1, wherein the desired change to the initial operation parameters consists of at least one of the following: an increase in injection rate, an increase in injection duration, a slurry density decrease to effect fracture dimensions, an increase in slurry density to pack a natural fracture, and a decrease in slurry viscosity.

5. The method of claim 1, wherein the real time measured injection data consists of at least one of the following: bottom hole pressure, well head pressure, annular pressure, surface tubing pressure, injection rate, injection fluid density, temperature, viscosity, solids concentration, injection fluid flow rate, and time elapsed in injection.

6. The method of claim 1, wherein the potential occurrence of a risk consists of at least one of the following risks: a loss of containment of the injection fluid in the target zone, a fracture growth into the upper boundary zone, slurry migration out of the target zone, exceeding one or more regulatory injection operation limits, damage to the reservoir, and occurrence of an unknown and naturally occurring permeable conduit in the reservoir, natural fracture in the reservoir, or high gas saturation region in the reservoir impacting leak-off rate.

7. The method of claim 1, wherein the injection operation is a water flood operation or a waste disposal operation.

8. The method of claim 1, further comprising: calculating an operating window, defined as the difference between a well maximum allowed surface injection pressure and a dynamic, well-head pressure obtained while pumping at a maximum scheduled pump rate.

9. The method of claim 1, wherein the desired operational change is verified by the program based on real time measured data communicated via the network.

10. A method for managing an injection operation in a well having a wellbore extending through a target injection zone in a subterranean reservoir, wherein the injection operation is performed according to initial operation parameters having a plurality of operational parameters, the method comprising:
    receiving, at a control computer having a non-transitory memory, a processor, and a software program executable by the control computer, measured injection data, in real time via a computerized network, from sensor equipment at the well;
    simulating, using the program and using the real time measured data, a plurality of injection operations in a computer-modelled reservoir and simulating resulting fracturing of the computer-modelled reservoir;
    predicting, in response to simulating the injection operations and fracturing, potential ability to optimize the injection operation while maintaining containment of an injection fluid in the target injection zone;
    simulating, using the program, a plurality of modified injection operations in a computer-modelled reservoir and simulating resulting fracturing of the computer-modelled reservoir;
    determining, using the program and based on the simulated modified injection operations and fracturing, at least one desired change to the initial operation parameters to optimize the injection operation while maintaining containment of an injection fluid in the target injection zone; and communicating the desired change to the initial operating parameters, via the network, during the injection operation.

11. The method of claim 10, further comprising modifying the injection operation's initial operation parameters in accordance with the determined at least one desired change to the operation parameters, during the on-going injection operation.

12. The method of claim 11, wherein the modification to the operation parameters is automatically performed by surface and well equipment connected to the network in response to communicating the desired change.

13. The method of claim 10, wherein the desired change to the initial operation parameters consists of at least one of the following: an increase in injection rate, an increase in injection duration, a slurry density decrease to effect fracture dimensions, an increase in slurry density to pack a natural fracture, and a decrease in slurry viscosity.

14. The method of claim 10, wherein the real time measured injection data consists of at least one of the following: bottom hole pressure, well head pressure, annular pressure, surface tubing pressure, injection rate, injection fluid density, temperature, viscosity, solids concentration, injection fluid flow rate, and time elapsed in injection.

15. The method of claim 10, wherein the potential ability to optimize the injection operation while maintaining containment of an injection fluid in the target injection zone consists of at least one of the following: increasing the disposal capacity of the target zone, increasing fracturing in the target zone while maintaining operations within regulatory limits, maximizing contained volume in the target zone, or maximizing slurry disposal ion the target zone.

16. The method of claim 10, wherein the injection operation is a water flood operation or a waste disposal operation.

17. A method for managing injection operations in a well having a wellbore extending through a target injection zone in a subterranean reservoir, the method comprising:

receiving, at a control computer having a non-transitory memory, a processor, and a software program executable by the control computer:

an initial batch injection schedule comprising a series of planned batch injections for the well, each batch injection having a set of batch injection parameters;

measured batch injection data from a series of prior run batch injections performed at the well from sensor equipment at the well;

simulating, using the program and the measured data, planned future batch injections according to the initial batch injection schedule, in a computer-modelled reservoir and simulating resulting fracturing of the computer-modelled reservoir;

predicting, in response to simulating the planned future batch injections, potential occurrence of a risk to the reservoir or the well upon performance of the planned future batch injections;

simulating, using the program, a plurality of modified batch injections which deviate from the planned future injections according to the initial batch injection schedule, using the computer-modelled reservoir, and simulating resulting fracturing of the computer-modelled reservoir;

determining, using the program and based on the simulated modified batch injections, a modified batch injection schedule comprised of a series of modified batch injections, each having injection parameters, to prevent the predicted occurrence of risk to the reservoir or well.

18. The method of claim 17, wherein the potential occurrence of a risk to the reservoir or the well consists of at least one of the following: a loss of containment of the injection fluid in the target zone, a fracture growth into the upper boundary zone, slurry migration out of the target zone, exceeding one or more regulatory injection operation limits, damage to the reservoir, and occurrence of an unknown and naturally occurring permeable conduit in the reservoir, natural fracture in the reservoir, or high gas saturation region in the reservoir impacting leak-off rate.

19. The method of claim 17, wherein batch injection operating parameters according to the modified batch injection schedule are automatically performed by surface and well equipment in response to communicating the batch injection operating parameters to the surface equipment, well equipment, or well.

20. The method of claim 17, wherein the modified batch injection schedule differs from the initial batch injection schedule in the operating parameters of at least one batch injection, the operating parameters consisting of at least one of the following: an increase in injection rate, an increase in injection duration, a slurry density decrease to effect fracture dimensions, an increase in slurry density to pack a natural fracture, and a decrease in slurry viscosity.

* * * * *